(12) United States Patent
Davis et al.

(10) Patent No.: US 6,931,532 B1
(45) Date of Patent: Aug. 16, 2005

(54) SELECTIVE DATA ENCRYPTION USING STYLE SHEET PROCESSING

(75) Inventors: Mark C. Davis, Durham, NC (US); John R. Hind, Raleigh, NC (US); Marcia L. Peters, Raleigh, NC (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,430

(22) Filed: Oct. 21, 1999

(51) Int. Cl.[7] ............................................... G06F 1/28
(52) U.S. Cl. .................... 713/167; 713/176; 713/200; 713/201; 713/155; 713/170; 713/189; 713/165; 713/182; 713/161; 713/166; 380/273; 380/277; 380/286; 380/44; 705/51; 705/71; 705/76
(58) Field of Search ............................... 713/200–201, 713/165, 167, 155, 189, 182, 150, 161, 166, 170, 176, 162, 169, 171, 157, 175; 380/273, 277, 286, 44, 28, 282, 259; 705/51, 71, 76, 72, 52, 75, 78

(56) References Cited

U.S. PATENT DOCUMENTS

| | | | | |
|---|---|---|---|---|
| 5,787,175 A | * | 7/1998 | Carter ......................... | 713/165 |
| 5,933,498 A | * | 8/1999 | Schneck et al. .............. | 705/54 |
| 5,935,248 A | * | 8/1999 | Kuroda ........................ | 713/201 |

(Continued)

OTHER PUBLICATIONS

Widergren et al. "XML for Data Exchange", 1999, IEEE, pp. 840–842.*
Psaila et al. "ERX, A Data Model for Collections of XML Documents", Knowledge and Data Engineering Exchange, Nov. 7, 1999) Proceedings, pp. 99–104.*

Flammia, "XML and Style Sheets Promise to Make the Web More Accessible", IEEE Expert, May/Jun. 1997.*

Primary Examiner—Gregory Morse
Assistant Examiner—Tongoc Tran
(74) Attorney, Agent, or Firm—Myers, Bigel, Sibley & Sajovec, PA

(57) ABSTRACT

A method, system, and computer program product for selectively encrypting one or more elements of a document using style sheet processing. Disclosed is a policy-driven augmented style sheet processor (e.g. an Extensible Stylesheet Language, or "XSL", processor) that creates a selectively-encrypted document (e.g. an Extensible Markup Language, or "XML", document) carrying key-distribution material, such that by using an augmented document processor (e.g. an augmented XML processing engine), an agent can recover only the information elements for which it is authorized. The Document Type Definition (DTD) or schema associated with a document is modified, such that the DTD or schema specifies a reference to stored security policy to be applied to document elements. Each document element may specify a different security policy, such that the different elements of a single document can be encrypted differently (and, some elements may remain unencrypted). The key distribution material enables a document to be encrypted for decryption by an audience that is unknown at the time of document creation, and enables access to the distinct elements of a single encrypted document to be controlled for multiple users and/or groups of users. In this manner, group collaboration is improved by giving more people easier access to information for which they are authorized, while protecting sensitive data from unauthorized agents. A key recovery technique is also defined, whereby the entire document can be decrypted by an authorized agent regardless of how the different elements were originally encrypted and the access protections which were applied to those elements.

60 Claims, 23 Drawing Sheets

U.S. PATENT DOCUMENTS

| | | | |
|---|---|---|---|
| 5,937,066 A | * | 8/1999 | Gennaro et al. ............ 380/286 |
| 6,154,840 A | * | 11/2000 | Pebley et al. ............... 713/160 |
| 6,236,727 B1 | * | 5/2001 | Ciacelli et al. ............. 380/212 |
| 6,327,574 B1 | * | 12/2001 | Kramer et al. ................ 705/14 |
| 6,330,569 B1 | * | 12/2001 | Baisley et al. ............. 707/203 |
| 6,446,256 B1 | * | 9/2002 | Hyman et al. ............... 717/143 |
| 6,463,440 B1 | * | 10/2002 | Hind et al. .................. 707/102 |
| 6,476,833 B1 | * | 11/2002 | Moshfeghi .................... 345/854 |
| 6,507,856 B1 | * | 1/2003 | Chen et al. .................. 715/513 |
| 6,585,778 B1 | * | 7/2003 | Hind et al. .................. 715/513 |

* cited by examiner

```
                    331  321           311
                       \  \           /   312'      322
              <?xml encoding="UTF-8"?>    /         /
        310 <!ENTITY % empl_mgr_hr "ldap://acmecorp.com/cn=emh,ou=policy,o=acme">
        320 <!ENTITY % empl_medical "ldap://acmecorp.com/cn=em,ou=policy,o=acme">
        330 <!ENTITY % unrestricted "ldap://acmecorp.com/cn=ur1,ou=policy,o=acme">
              <!ELEMENT record (empl_name,ser_nbr,date_of_hire,curr_salary,medical_condition)*>
              ┌<!ELEMENT empl_name (#PCDATA) >   ~332
              │                        351
        350 │ <!ATTLIST empl_name 353  354   355
        352 └─datapolicy:url  CDATA #FIXED %unrestricted; >  356
              ┌<!ELEMENT ser_nbr (#PCDATA) >
        360 │ <!ATTLIST ser_nbr              365
              └─datapolicy:url  CDATA #FIXED %unrestricted; >
              ┌<!ELEMENT date_of_hire (#PCDATA) >
        370 │ <!ATTLIST date_of_hire         375
              └─datapolicy:url  CDATA #FIXED %unrestricted; >
              ┌<!ELEMENT curr_salary (#PCDATA) >
        380 │ <!ATTLIST curr_salary          385
              └─datapolicy:url  CDATA #FIXED %empl_mgr_hr; >
              ┌<!ELEMENT medical_condition (#PCDATA) >
        390 │ <!ATTLIST medical_condition    395
              └─datapolicy:url  CDATA #FIXED %empl_medical; >
```

```
<? xml version="1.0"  encoding ="UTF-8" ?>                                      405
<!DOCTYPE record SYSTEM "ldap://acmecorp.com/cn=personnel,ou=dtd,o=acme?xmlProperty" >
<empl_name>
John Q. Smith         402
</empl_name>
<ser_nbr>
E135246               404
</ser_nbr>
<date_of_hire>
01/01/1980            406
</date_of_hire>
<curr_salary>
3395.00               408
</curr_salary>
<medical_condition>
diabetic              410
</medical_condition>
```

Fig. 4A

```
420
<? xml version="1.0" encoding ="UTF-8" ?>
<!DOCTYPE record SYSTEM "ldap://acmecorp.com/cn=personnel,ou=dtd,o=acme?xmlProperty" >
                                                                                    434
<encrypt:class name="1" type="3DES" len="168" tempkey="MjdqcmhlQHVzLmlibS5jb20xRzB">
<encrypt:key DN="cn=managers,ou=groups,o=acme" KeyIdentifier="MIIGEjCCBbygAwIBAgIKFZrHywAQ"
Ekey="QAAAAAZANBgkqhkiG9w0BAQUFAD"/>
<encrypt:key DN="cn=E135246,ou=users,o=acme" KeyIdentifier="CSqGSIb3DQEJARYbYm9zc0BicnFQ"
Ekey="QudGlucmFsZWlnaC5pYm0uY29IMQ"/>
<encrypt:key DN="cn=hr,ou=groups,o=acme" KeyIdentifier="DlbQzc0BEYbCicnFSqGS3YJmAR9Q"
Ekey="sGQFIYcmWtMlnaC2u5ZudpYm9Q0u"/>
</encrypt:class>
                                                      444
<encrypt:class name="2" type="BLOWFISH" len="128" tempkey="AHIAcQBuAHQAYgAuAHIAYQ"/>
<encrypt:key DN="cn=medical,ou=groups,o=acme" KeyIdentifier="QTA5MDMyMDQ0MTZaFw0wMDA5MDI"
Ekey="EgYDVQQLEwdSYWxlaWdoMR"/>
<encrypt:key DN="cn=E135246,ou=users,o=acme" KeyIdentifier="CSqGSIb3DQEJARYbYm9zc0BicnFQ"
Ekey="EwJVUzELMAkGA1UECBMCTK"/>
</encrypt:class>
```

```
<empl_name>
John Q. Smith
</empl_name>
<ser_nbr "">
E135246
</ser_nbr>
<date_of_hire>
01/01/1980
</date_of_hire>
<curr_salary>
422 — <encrypt:data class="1">  423
        3395.00
      </encrypt:data>
</curr_salary>
<medical_condition>
424 — <encrypt:data class="2">  425
        diabetic
      </encrypt:data>
</medical_condition>
```

```xml
<?xml version="1.0" encoding="UTF-8" ?>
<!DOCTYPE record SYSTEM "ldap://acmecorp.com/cn=personnel,ou=dtd,o=acme?xmlProperty" >

<encrypt:class name="1" type="3DES" len="168">
<encrypt:key DN="cn=managers,ou=groups,o=acme" KeyIdentifier="MIIGEjCCBbygAwIBAgIKFZrHywAQ"
Ekey="QAAAAAzANBgkqhkiG9w0BAQUFAD"/>
<encrypt:key DN="cn=E135246,ou=users,o=acme" KeyIdentifier="CSqGSIb3DQEJARYbYm9zc0BicnFQ"
Ekey="QudGlucmFsZWlnaC5pYm0uY29tMQ"/>
<encrypt:key DN="cn=hr,ou=groups,o=acme" KeyIdentifier="DIbQzc0BEYbCicnFSqGS3YJmAR9Q"
Ekey="dpYmGmFsZWaCc50u9httMYlu2QuQ"/>
</encrypt:class>

<encrypt:class name="2" type="BLOWFISH" len="128">
<encrypt:key DN="cn=medical,ou=groups,o=acme" KeyIdentifier="QTA5MDMyMDQ0MTZaFw0wMDA5MDI"
Ekey="EgYDVQQLEwdSYWxiaWdoMR"/>
<encrypt:key DN="cn=E135246,ou=users,o=acme" KeyIdentifier="CSqGSIb3DQEJARYbYm9zc0BicnFQ"
Ekey="EwJVUzELMAkGA1UECBMCTK"/>
</encrypt:class>
```

```
<empl_name>
John Q. Smith
</empl_name>
<ser_nbr">
E135246
</ser_nbr>
<date_of_hire>
01/01/1980
</date_of_hire>
<curr_salary>
  <encrypt:data class="1">     452
    Ym0uY29tMQ       456
  </encrypt:data>   453
</curr_salary>
<medical_condition>
  <encrypt:data class="2">     454
    MxDDAKBgNVB
  </encrypt:data>   455
</medical_condition>
```

Fig. 4C2

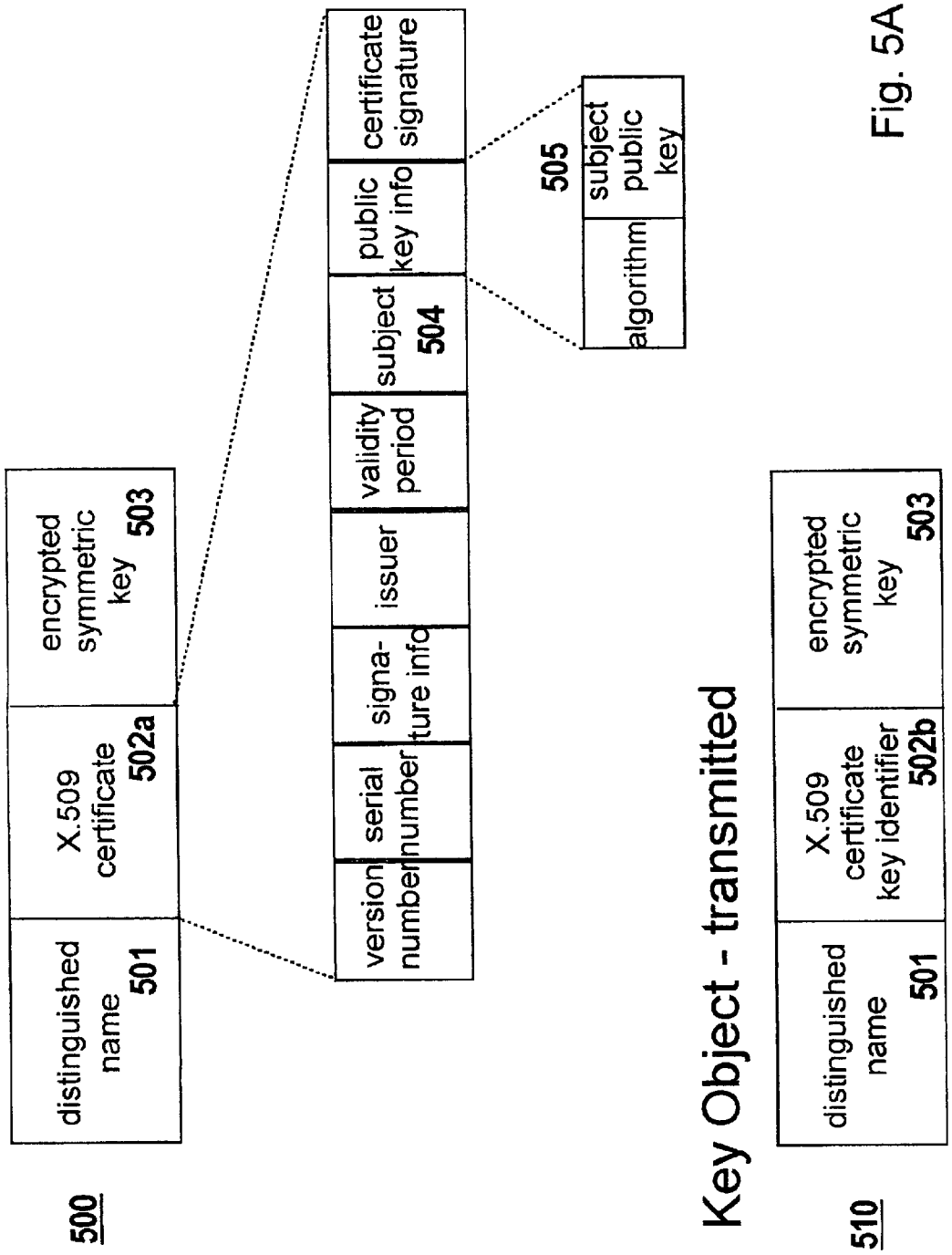

preprocessingKeyClass Object 520

| encryption strength 521 | key class object 522 | plaintext symmetric key 523 |
|---|---|---|

Fig. 5B keyClass Object 530

| class identifier 531 | encryption algorithm identifier 532 | key length 533 | optional hints for algorithm 534 | key object 1 535 | key object 2 536 | ... | key object N 539 |
|---|---|---|---|---|---|---|---|

Fig. 5C

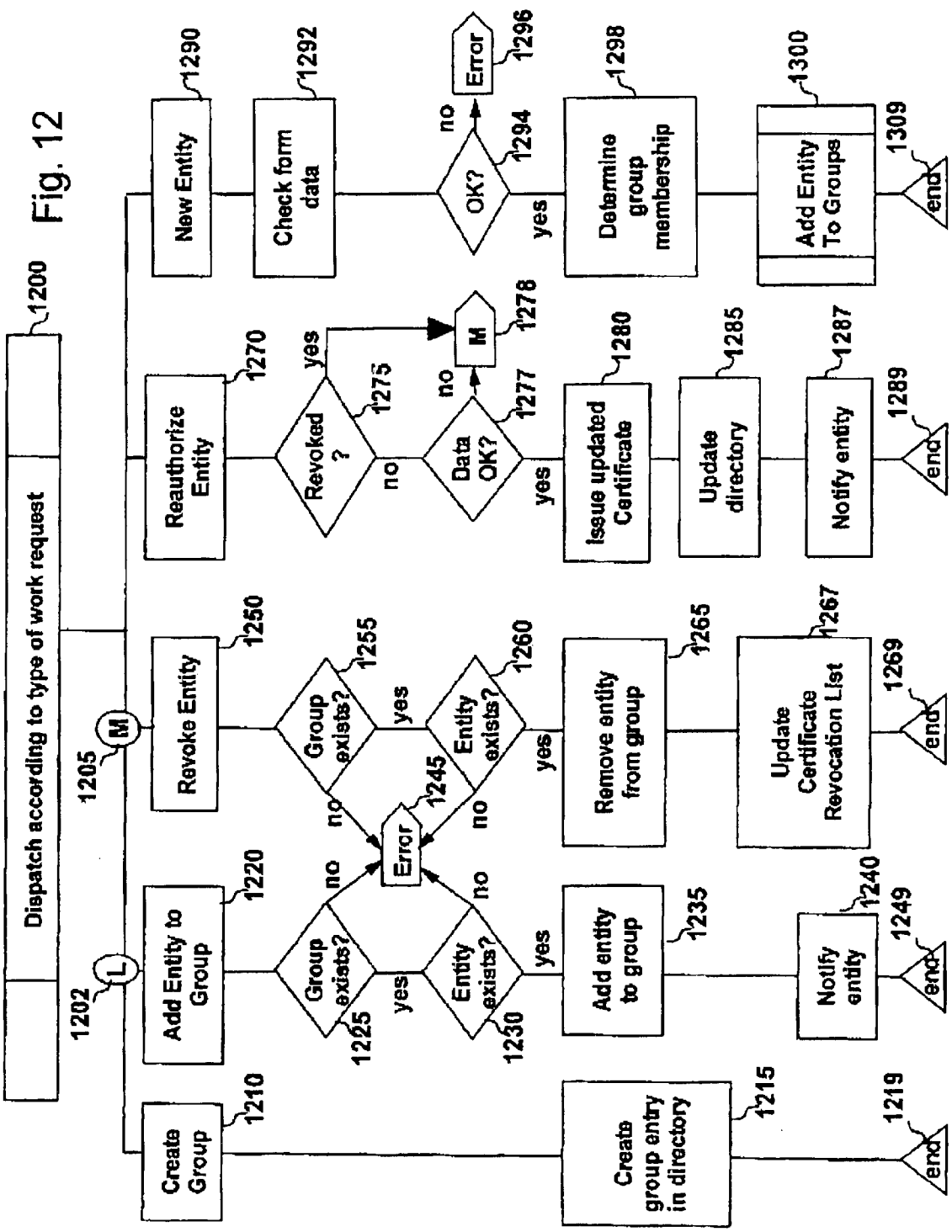

SELECTIVE DATA ENCRYPTION USING STYLE SHEET PROCESSING

RELATED INVENTIONS

This application is related to the applications having Ser. No. 09/422,492 entitled "Selective Data Encryption Using Style Sheet Processing for Decryption by a Client Proxy", Ser. No. 09/422,537 entitled "Selective Data. Encryption Using Style Sheet Processing for Decryption by a Group Clerk", and Ser. No. 09/422,431 entitled "Selective Data Encryption Using Style Sheet Processing for Decryption by a Key Recovery Agent", all assigned to the same assignee and filed concurrently herewith on Oct. 21, 1999.

BACKGROUND OF THE INVENTION

1. Field of the Invention

The present invention relates to a computer system, and deals more particularly with a method, system, and computer program product for selectively encrypting one or more document elements using style sheet processing. The document may be an Extensible Markup Language (XML) document, and the style sheet processor may be an Extensible Stylesheet Language (XSL) processor.

2. Description of the Related Art

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message or an electronic document requested by a user of the Internet, and is equally useful for data that is to be securely stored, such as the account records for customers of a bank or credit company.

The transformation process performed on the original data is referred to as "encryption". The process of reversing the transformation, to restore the original data, is referred to as "decryption". The terms "encipher" and "decipher" are also used to describe these processes, respectively. A mechanism that can both encipher and decipher is referred to as a "cipher".

Use of a "key" during the encryption and decryption processes helps make the cipher more difficult to break. A key is a randomly-generated number factored into operation of the encryption to make the result dependent on the key. The value used for the key in effect "personalizes" the algorithm, so that the same algorithm used on the same input data produces a different output for each different key value. When the value of this key is unknown to unauthorized persons, they will not be able to duplicate or to reverse the encryption.

One of the oldest and most common security systems today is what is known as a "private key" or "symmetric" security system. Private key systems involve two users, both of whom have a shared secret (or private) key for encrypting and decrypting information passed between them over a network. Before communications can occur, the two users must communicate in some secure manner to agree on this private key to ensure the key is known only to the two users. An example of a cipher used for private key security is the Data Encryption Algorithm ("DEA"). This algorithm was developed by scientists of the International Business Machines Corporation ("IBM"), and formed the basis of a United States federal standard known as the Data Encryption Standard ("DES"). Private key systems have a number of drawbacks in an open network environment such as the Internet, however, where users will conduct all communications over the open network environment and do not need or want the added overhead and expense of a separate secure means of exchanging key information before secure network communications occur.

To address the limitations of private key systems, security systems known as "public key", or "asymmetric", systems evolved. In a public key system, a user has a key pair that consists of a private key and a public key, both keys being used to encrypt and decrypt messages. The private key is never to be divulged or used by anyone but the owner. The public key, on the other hand, is available to anyone who needs to use it. As an example of using the key pair for encrypting a message, the originator of a message encrypts the message using the receiver's public key. The receiver then decrypts the message with his private key. The algorithm and the public key used to encrypt a message can be exposed without comprising the security of the encrypted message, as only the holder of the associated private key will be able to successfully decrypt the message. A key pair can also be used to authenticate, or establish the identity of, a message originator. To use a key pair for authentication, the message originator digitally signs the message (or a digest thereof) using his own private key. The receiver decrypts the digital signature using the sender's public key. A common means of publishing a public key to be used for a particular receiver is in an X.509 certificate, also known as a "digital identity".

Public key encryption is generally computationally expensive, having numerous exponentiation operations. It also requires much longer key material than a symmetric key algorithm to provide equivalent security. Hence it is used sparingly, preferably only for cryptographic operations that need its unique properties. Symmetric key encryption is more widely used for bulk data encryption/decryption, because it demands less of the CPU, using primarily repeated shift, rotate, exclusive OR, and table lookup operations.

Public and symmetric key encryption methods are often combined. One example of their combination is the Secure Sockets Layer (SSL), and its follow-on replacement known as Transport Layer Security (TLS). Another example is the Internet Key Exchange (IKE) protocol of the IP Security Protocol, as defined in the Internet Engineering Task Force (IETF) document RFC 2411, "IP Security Document Roadmap".

In general, both the SSL and IKE protocols perform similar steps. First the parties are mutually authenticated using public key encryption, during which process X.509 certificates are exchanged and encryption algorithms negotiated. Then the first party creates a symmetric key and encrypts it using the second party's public key. The encrypted symmetric key is transferred to the second party, which then decrypts it using its private key. This process of negotiation and key transfer is called a "key agreement". A key agreement may have a predetermined expiration time, and the protocol may include means for subsequent key agreements. After completing a key agreement, the symmetric key can be used to perform efficient bulk data encryption between the parties.

The majority of current encryption techniques deal with encrypting an entire document for transmission to a known audience. Little attention has been given to the business-to-business security requirements of today's complex networking environments, where a document must flow asynchronously through a number of intermediate agents such as transcoders, gateways, and firewalls (where each agent may have a unique need to know different aspects of the transmitted information) and where the audience cannot be precisely determined beforehand.

Furthermore, key distribution in a complex, multi-business networking environment is a critical issue. If two parties repeatedly exchange encrypted data using the same key over and over again for successive documents (such as might occur when two businesses need to exchange transactional information in an on-going manner), then it makes it easier for a third party to crack the encryption and discover the document content of all the repeated transmissions. Thus, there must be a secure method for periodically distributing new keys between communicating parties. Likewise, if keys are changed and the subsequent keys are varied by an easily computed function of the base shared key, then the repeated transmissions would be easier to crack than if a random key were selected for each new transmission. It is therefore preferable to use a randomly-generated key value for each subsequent key. It is also preferable to use a new key for each document, to increase the security of the document. If a random key is used for each document, then a secure technique must exist to distribute this key to the receiver with a minimum of system overhead.

A document may be securely stored in an encrypted file system, or an encrypted file may be stored on a server where it can be accessed only by those possessing the decryption key. For the same reasons discussed above, each document should be encrypted with a different random key and a means must exist of distributing this key to all those who need to read the document.

A plaintext document can be protected during transmission by encrypting the transport-layer connection using SSL or TLS, or by creating an encrypted data-link-layer tunnel using the IP Security Protocol (IPSec) or the Layer 2 Tunneling protocol (L2TP). However, such methods of protection only apply to connection-oriented systems where an end-to-end session exists between the sender and receiver at the time of transmission. Both offer techniques whereby the encryption key hiding the data is changed at regular intervals over the life of the session.

These approaches (encrypting the file, the file system, or the session) are not useful in some situations, however. In situations where several agents (such as a series of intermediaries including gateways, transcoders, and/or firewalls) must handle the document in succession, it may be necessary for each intermediary to have access to some of the encrypted data elements within a file or document. This implies that the intermediaries need the key for decrypting the file, making protection of the key a logistical nightmare. When encryption is performed at the level of the entire document, then an intermediary that receives the key will have access to the entire document rather than just those elements that may be needed for this intermediary's particular function, thus increasing the potential for unauthorized agents to gain access to the security-sensitive information.

Another problem situation for existing techniques (such as relying on an encrypted session) is transmitting documents through store-and-forward systems such as message queuing (MQ), where the sender and receiver connect to a store-and-forward server at different times and never establish end-to-end connections to one another. In an MQ system, even if the connection between the sender and the MQ server is encrypted, and the connection between the MQ server and the receiver is encrypted, nevertheless the document is stored as plaintext on the MQ server for some period of time. This obviously creates a security exposure unless access to the MQ server is strictly controlled. It is unreasonable for the creator of security-sensitive information to rely on the MQ server (possibly including multiple such servers in a network path) to provide sufficient protection for preventing access to his plaintext document.

The existing approaches which have been described above (encrypting the session, encrypting the file system, or encrypting the file) are also not useful in the situation where the target client device has such limited CPU processing power that it cannot perform the necessary encryption/decryption operations, or performs them so slowly as to make the system unusable. Electronic commerce is becoming increasingly important in today's global economy. Electronic commerce, also known as "e-commerce" or "e-business", involves the secure transfer of business-critical data to selected recipients over non-secure public networks such as the Internet. Consider the overall life cycle of an e-business document. In the general case, the document passes through various hands or agents, which differ greatly in terms of their "need to know specific data elements within the document. Consider an employee record or document generated by an Enterprise Resource Planning (ERP) software application. This employee document is an example of a single document that may contain elements needing different types of access protection. The document may contain public information such as the employee's name, employee serial number, and date of hire. This information may need to be in plaintext form so the document is searchable in a database. The employee document may also contain salary information that only managers may see. It may also contain payroll information that only the payroll department should view. Finally it may contain medical data that only medical personnel should see. In addition, the employee should be able to view the entire contents of his own employee document. Besides transit over a network, the document may pass through agents that store and forward the data, such as a company repository which records and time stamps transmitted and received documents for legal purposes, an e-mail system, an e-mail archive, an e-mail screening program on a firewall, and so forth. It is unreasonable to fully trust all the intermediaries in such an electronic commerce system. Furthermore, at the time of document construction, it is virtually impossible to foresee who all the ultimate consumers (i.e. requesting users or application programs) of the data may be, or which intermediary agents may handle the data, and yet the data must be protected. It is also unreasonable to create a customized document for each potential consumer, or to create a customized document upon each request by a different consumer, where the customized document would contain only those elements for which the consumer is authorized.

Commonly assigned (Ser. No. 09/240,387, filed Jan. 29, 1999, titled "Method, System, and Apparatus for Selecting Encryption Levels Based on Policy Profiling" suggests tagging data elements in Extensible Markup Language ("XML") documents with field-level or record-level security information. By inspecting this security-level information and consulting directory entries concerning an individual's access privileges, a server responding to a document request suppresses any document elements for which the requester is unauthorized, determines the encryption algorithm and key length required by the most restrictive remaining element (i.e., the remaining element having the highest-level security requirements), and encrypts the entire resulting filtered document accordingly. This invention does not some the problem of encrypted documents with multiple authorized receivers and agents, each with a different need-to-know (i.e. it does not restrict the ability to read certain fields of a document to certain individuals or groups). Nor does it address the problem of client devices with insufficient processing power to decrypt received documents.

Several solutions for disturbing encrypted key material along with the encrypted document to which the key applies are known in the art. The SMIME industry standard defined by the IETF is used in secure email transmission, providing an encapsulation of digitally signed and encrypted objects. (See SMIME charter information that is available from the IETF for more information.) The Lotus Notes® software uses a proprietary implementation for key distribution. "Lotus Notes" is a registered trade of Lotus Development Corporation and/or IBM, and more information about Lotus Notes is available by contacting IBM.) However, neither of these existing approaches suggests that individual document fields be encrypted (and other fields not encrypted). Nor do they suggest having different authorized viewing communities, or using multiple and/or different encryption algorithms and/or keys for different fields in a document that need different levels of security (nor is a capability for distributing multiple keys per document available).

Accordingly, what is needed is a technique with which security policy can be efficiently enforced in a complex distributed network computing environment, incorporating many complex factors such as those described above.

SUMMARY OF THE INVENTION

An object of the present invention is to provide a technique for enforcing security policy efficiently in a complex distributed networking environment.

Another object of the present invention is to provide this technique in a manner that enables data to be protected throughout the business process, and throughout transmission between agents in a network path from a document server to a document receiver, making security-sensitive information in the document visible only to those agents having a need to know the information while protecting the information from disclosure to other parties.

Yet another object of the present invention is to provide this technique whereby each of the different elements within a single document may use a different security policy, including the ability to use different security algorithms, keys, and key lengths from one element to another.

Still another object of the present invention is to provide this technique by applying style sheets to documents encoded in tag languages such as the Extensible Markup Language.

A further object of the present invention is to provide a key distribution technique which enables a different key to be used for each encrypted document or document element, where each key used can be distributed to all document receivers without creating a security exposure.

Another object of the present invention is to provide this key distribution technique in a manner that enables an encryption key to be recovered whether the encrypted document resides in a file system or is in a queue en route to its target audience.

A further object of the present invention is to provide a selective data encryption technique that reduces the amount of data that must be encrypted to provide a given level of security, thereby improving the performance of security processing for client devices with limited capabilities.

Still another object of the present invention is to provide a technique for recovering the key(s) used to encrypt elements of a document.

Another object of the present invention is to provide these techniques in a backward-compatible manner, such that existing style sheets continue to function properly.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for enforcing security policy using style sheet processing. In one embodiment, this technique comprises: providing an input document; providing one or more stored policy enforcement objects, wherein each of the stored policy enforcement objects specifies a security policy to be associated with zero or more elements of the input document; providing a Document Type Definition (DTD) corresponding to the input document, wherein the DTD has been augmented with one or more references to selected ones of the stored policy enforcement objects; executing an augmented style sheet processor; receiving an encrypted output document at a client device; executing an augmented document processor, thereby creating a result document; and rendering the result document on the client device. Executing the augmented style sheet processor preferably comprises: loading the DTD; resolving each of the one or more references in the loaded DTD; instantiating the policy enforcement objects associated with the resolved references; executing selected ones of the instantiated policy enforcement objects during application of one or more style sheets to the input document, wherein a result of the executing selected ones is an interim transient document reflecting the execution; generating one or more random encryption keys; encrypting selected elements of the interim transient document, wherein a particular one of the generated random encryption keys may be used to encrypt one or more of the selected elements, while leaving zero or more other elements of the interim transient document unencrypted; encrypting each of the one or more random encryption keys; and creating the encrypted output document, where the encrypted output document comprises the zero or more other unencrypted elements, the selected encrypted elements, and the encrypted encryption keys. Executing the augmented document processor preferably comprises decrypting the received output document for an individual user or process on the client device.

Alternatively, the DTD may be replaced by a schema.

The interim transient document may comprise one or more encryption tags identifying elements needing encryption. The input document may be specified in an Extensible Markup Language (XML) notation, and the output document may be specified in this XML notation. The style sheets may be specified in an Extensible Stylesheet Language (XSL) notation.

The stored policy enforcement objects may further comprise executable code for overriding a method for evaluating the elements of the input document, and wherein executing selected ones further comprises overriding this method for evaluating. This method may be a value-of method of the XSL notation, and overriding the value-of method may be by subclassing this value-of method. This overriding may further comprise generating encryption tags, and inserting the generated encryption tags into the interim transient document to surround elements of the interim transient document which are determined to require encryption. Encrypting selected elements may further comprise encrypting those elements surrounded by the inserted encryption tags.

Each of the instantiated policy enforcement objects may further comprise: a specification of a community that is authorized to view the elements associated with the security policy; and an encryption requirement for the elements associated with the security policy. This encryption requirement may further comprise specification of an encryption algorithm. Or, the encryption requirement may further comprise specification of an encryption algorithm strength value, and/or specification of an encryption key length. The encryption requirement may have a null value to indicate that the specified security policy does not require encryption.

Encrypting the encryption keys may further comprise encrypting a different version of each of the random encryption keys for each of one or more members of each of zero or more of the communities which uses this encryption key, and wherein each of the different versions is encrypted using a public key of the community member for which that different version was encrypted.

Encrypting the selected elements may use a cipher block chaining mode encryption process.

This technique may further comprise: creating a key class for each unique community, wherein the key class is associated with each of the encrypted elements for which this unique community is an authorized viewer, and wherein the key class comprises: (1) a strongest encryption requirement of the associated encrypted elements; (2) an identifier of each member of the unique community; and (3) one of the different versions of the encrypted encryption key for each of the identified community members. Generating the one or more random encryption keys may generate a particular one of the random encryption keys for each of the key classes, wherein each of the different versions in a particular key class is encrypted from the generated encryption key generated for the key class. Encryption of the selected elements may use that one of the particular random encryption keys which was generated for the key class with which the selected element is associated.

Decrypting the output document may further comprise: determining zero or more of the communities of which the individual user or process is one of the members; decrypting, for each of the determined communities, the different version of the random encrytion key which was encrypted using the public key of this one member, wherein the decrypting uses a private key of the one member which is associated with the public key which was used for encryption, thereby creating a decrypted key; and decrypting selected ones of the encrypted elements in the output document using the decrypted keys, wherein the selected ones of the encrypted elements are those which were encrypted for one of the determined communities. Rendering the output document may further comprise rendering the decrypted selected ones and the other unencrypted elements.

Or, decrypting the output document may further comprise: determining zero or more of the key classes which identify the individual user or process as one of the members; decrypting, for each of the determined key classes, the different version of the random encrytion key in the key class which was encrypted using the public key of this one member, wherein the decryption uses a private key of the one member which is associated with the public key which was used for encryption, thereby creating a decrypted key; and decrypting selected ones of the encrypted elements in the output document using the decrypted keys, wherein the selected ones of the encrypted elements are those which were encrypted for the key class. The rendering may further comprise rendering the decrypted selected ones and the other unencrypted elements.

The rendering may further comprise rendering a substitute text message for any of the selected encrypted elements in the output document which cannot be decrypted by the decryption of the output document.

The inserted encryption tags may surround either values of the elements or values and tags of the elements.

The present invention will now be described with reference to the following drawings, in which like reference numbers denote the same element throughout.

BRIEF DESCRIPTION OF THE DRAWINGS

FIG. 3 depicts a Document Type Definition (DTD) that has been augmented with security policy information, according to the preferred embodiments of the present invention;

FIGS. 4A–4C illustrate an example of an employee document on which the present invention may operate; an interim representation of the employee document after being augmented with security information; and the same document after encryption has been performed;

FIGS. 5A–5C depict examples of record or object formats that may be used with the preferred embodiments of the present invention;

FIGS. 7 through 12 illustrate flow charts depicting the logic with which the preferred embodiments of the present invention may be implemented.

DESCRIPTION OF THE PREFERRED EMBODIMENTS

Figure 1:
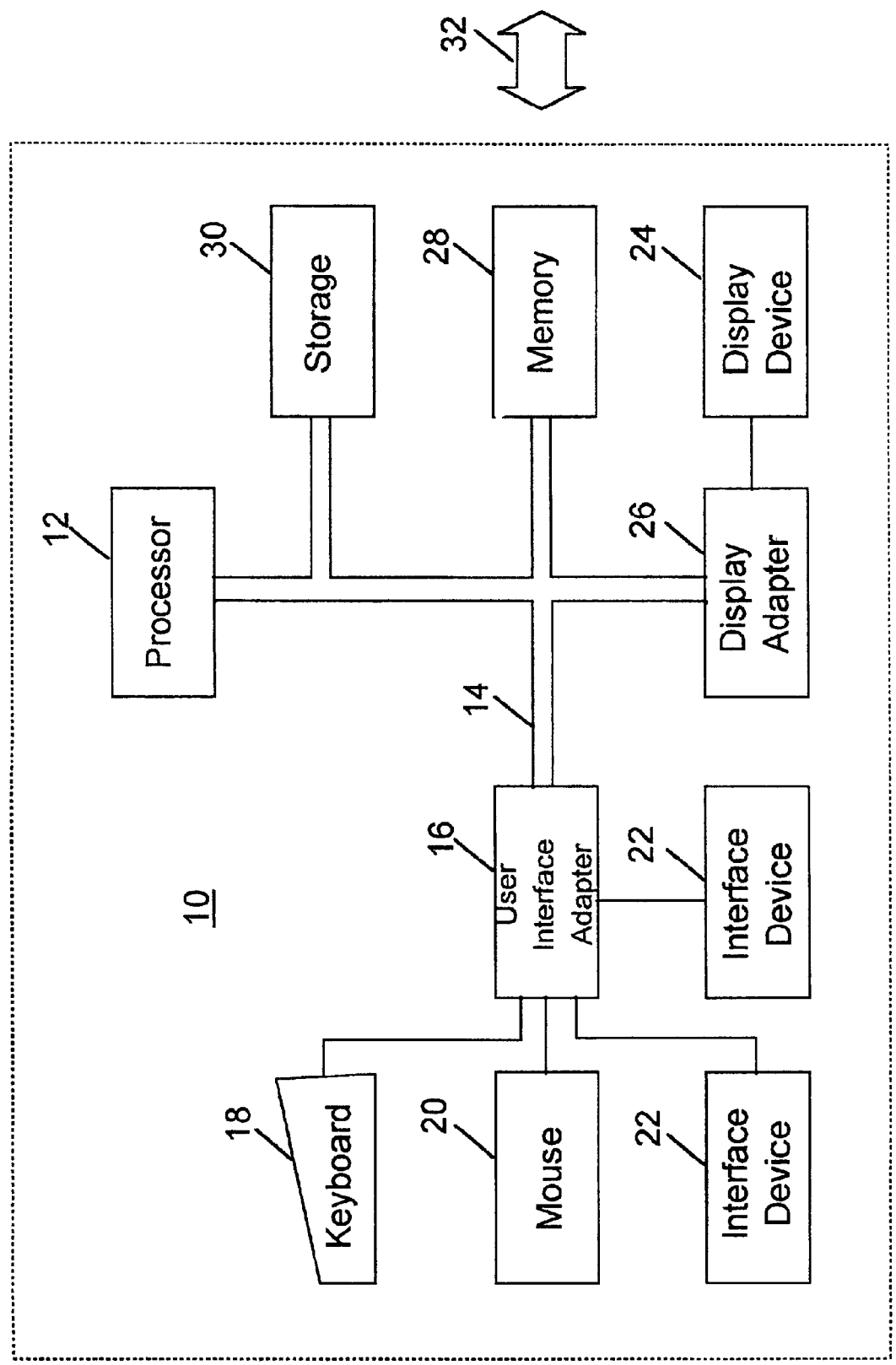
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
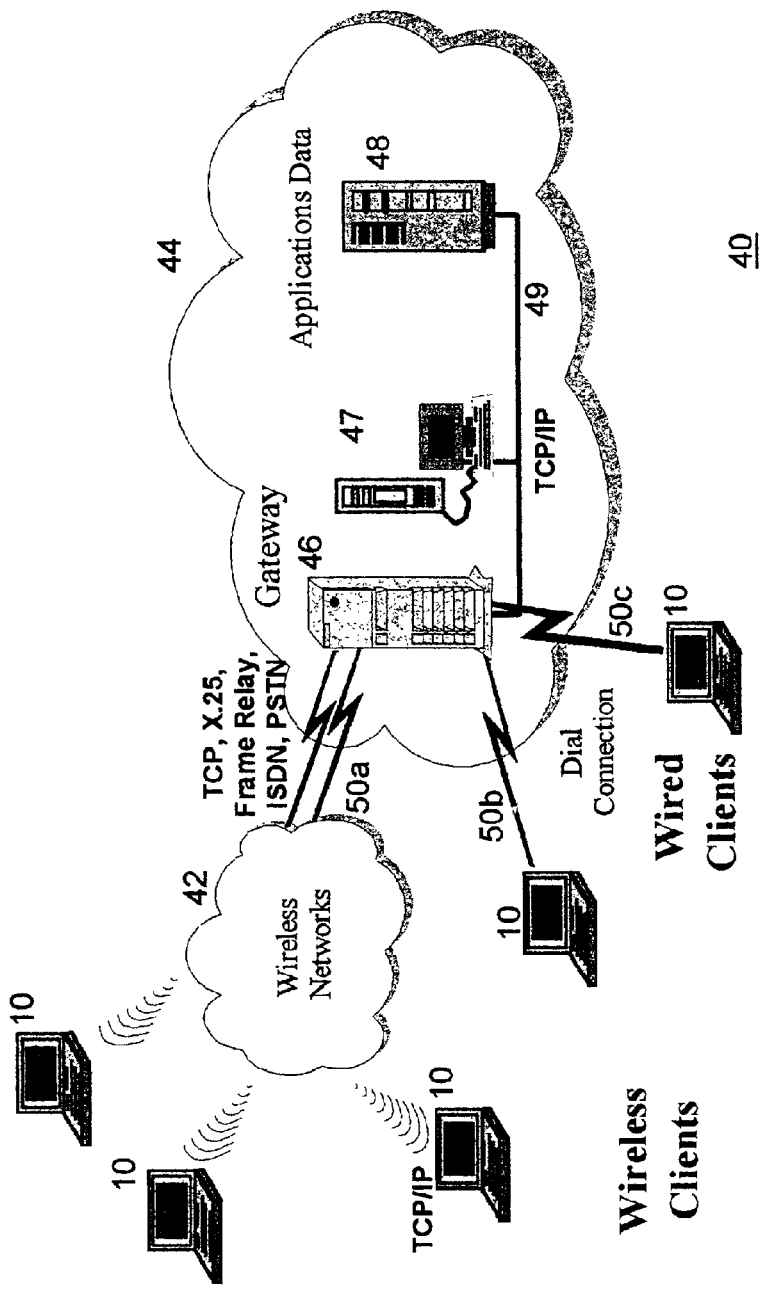
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of server 47 or an intermediary such as gateway 46 (hereinafter referred to simply as an intermediary)—and by workstation 10 in several embodiments of the present invention—from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server and the intermediary, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiments, the present invention is implemented as one or more computer software programs. The software may operate on a server, on a user workstation, and/or on an intermediary in a network, as one or more modules (also referred to as code subroutines, or "objects" in object-oriented programming) which are invoked upon request. The server or intermediary may be providing services in an Internet environment, in a corporate intranet or extranet, or in any other network environment.

The present invention defines a novel technique for selectively enforcing security policy in a distributed network computing environment using style sheet processing. A policy-driven augmented style sheet processor is used to create a selectively-encrypted document carrying key-distribution material, such that by using an augmented document processor an agent can recover a Document Object Model ("DOM") containing only the information elements for which the agent is authorized. In the preferred embodiments, the augmented style sheet processor is an augmented Extensible Stylesheet Language ("XSL") processor, the document is an XML document, and the augmented document processor is an augmented XML processing engine. Documents encoded in this fashion support improved group collaboration models, giving more people easier access to information for which they are authorized, while protecting sensitive data from unauthorized agents.

The present invention also provides a novel, efficient way to recover encrypted data from documents encoded according to the inventive techniques disclosed herein.

A number of terms to be used in the description of the preferred embodiments will now be defined.

"Community" refers to the collection of viewers to which a given authorization policy applies, in regard to a specific class of information. In the employee record example previously discussed, "all managers" or "employee plus all medical personnel" are examples of potential communities. In the preferred embodiments, a community is represented by the distinguished names (DNs) of one or more individuals and/or groups comprising that community. For each DN there is a corresponding X.509 certificate. In the preferred embodiments of the present invention, whenever a group can be represented by a single certificate, that group certificate is preferred in place of all the individual certificates for all the group's members (as will be described in more detail with reference to FIG. 7A).

"Element visibility" is a policy that defines to whom (where this may be people and/or application programs or processes) an element defined by a DTD (or alternatively, by a schema) should be made visible, and under what conditions. According to the preferred embodiments, a visibility policy defines (1) the minimum encryption strength required for the element, and (2) the community that is authorized to see the element's value. "Minimum encryption strength" can be resolved to a specific encryption algorithm and key length (e.g. by consulting a directory or lookup table, etc.). Encryption that is stronger than required can satisfy an element visibility policy, but weaker-than-required encryption is never satisfactory. (Note that while the preferred embodiments discuss dynamically determining an algorithm and key length to provide the minimum encryption strength which has been specified in a policy object, in an alternative approach the algorithm identifier and key length may be specified directly in the policy object without deviating from the scope of the present invention. In this case, a determination as to which of multiple algorithms and associated key lengths provides a stronger encryption may be made by using a look-up table in which the pertinent values are arranged in a particular order of strength, by coding the relative strength values directly into an implementation, etc. It will be obvious to one of ordinary skill in the art how the descriptions of the preferred embodiments are to be modified when using this alternative approach.)

"Group" refers to a collection of one or more individuals or processes (i.e. application entities) who are authorized members of a community. Preferably, a group is represented by a named object in an LDAP directory. (Alternatively, other storage repositories may be used.) The information stored for a particular group comprises: (1) the group's X.509 certificate; (2) a pointer (or other identifier) identifying a group clerk or clerks; and (3) pointers to each group member. (The X.509 certificates for each group member are then contained in, or pointed to from, the group member's stored information.) If a proxy or agent is authorized to act on behalf of a group or group member, the proxy is also identified as a group member.

"Group clerk" refers to a process that maintains the private key for a group, rather than having each group member store the private key. The clerk is contacted during the decryption of secure document content being served to a group member, and provides information for use in the decryption process. Each group has at least one clerk. Multiple clerks may be identified for a single group for purposes of hot backup and/or load distribution, where each such clerk has equivalent processing privileges on behalf of a particular group.

Commonly assigned U.S. Pat. No. 6,585,778 (Ser. No. 09/385,899, filed Aug. 30, 1999), titled "Enforcing Data Policy Using Style Sheet Processing", discloses a technique for controlling the content of a document using stored policy information. This invention, referred to hereinafter as the "referred invention", is incorporated herein by reference. The present invention defines an extension to the stored policy objects defined in this referenced invention, whereby the stored policy objects further comprise attributes specifying the element visibility information described above. These extensions will be described in more detail with reference to FIGS. 7A through 7C.

The employee record example previously discussed will be used to illustrate the benefits as well as the implementation of the present invention. Suppose a company maintains a database (or other repository) of information about its employees, and further suppose that the stored record for each employee comprises the employee's name, employee serial number, data of hire, current salary, and any pertinent medical conditions. FIG. 3 depicts an example of a DTD 300 that may be used to describe the data in the record for an employee of this company. As is well known in the art, a DTD is a definition of the structure of an XML document, and is encoded in a file which is intended to be processed, along with the file containing a particular XML document, by an XML parser. The DTD tells the parser how to interpret the document which was created according to that DTD. (Note that while the present invention is described with reference to information specified in a DTD, the information may be specified in other semantically equivalent forms. In particular, the schemes which are currently being standardized by the World Wide Web Consortium or "W3C" may be used instead of DTDs. Refer to "XML Schema Part 1: Structures", which is available from the W3C, for more information. References herein to a DTD are to be interpreted as applying equally to a schema.) This DTD 300 includes entries for the employee name ("empl_name") 350, the employee serial number ("ser_nbr"), "date_of_hire" 370, current salary ("curr_salary") 380, and "medical_condition" 390.

This DTD 300 has been augmented with data policy information which, according to the present invention, includes element visibility information that can be used to selectively encrypt the associated document elements, thereby restricting access to the values of the document elements. As defined by the referenced invention, data policy (as extended by the present invention to include element visibility) can be associated with a document's data structures by modifying the DTD for the document to specify the URI (Uniform Resource Indicator) of each applicable policy. Three different data policies, each with different element visibility, will be used to illustrate the employee record example. Each policy will now be discussed, along with the element visibility information specified in the stored policy objects.

The policy used for the employee name, serial number, and date of hire is to allow unrestricted access to these data items. Data policy information to enforce this unrestricted access policy (as well as any policies used with the present invention) is preferably stored in a directory database, such as an LDAP database. The stored policy can then be retrieved by sending a message to the database engine, specifying the URI of the desired information, as will be discussed in more detail below. An example URI that may be used to retrieve the "unrestricted" policy information for this example is shown at element 332. Note that XML parameter entity substitution has been used in this example DTD 300, whereby the relatively long URIs 312, 322, 332 are specified as the value associated with shorter entity names 311, 321, 331. These shorter names are then used within the attribute list declarations, such as "% unrestricted" 355 in the empl_name declaration 350. This approach has the advantage of reducing the number of characters within the DTD when a URI is used repeatedly, and also makes the attribute list declarations more intuitive and easier to read. (As will be obvious, the URIs may alternatively be replicated throughout the DTD without deviating from the scope of the present invention.) Note that the URIs 312, 322, 332 have been depicted as relative distinguished names (RDNs) for the stored data policy information. These RDNs are simply a unique identifier for storing the object in a directory. Alternative storage techniques (and identifications thereof) may be used without deviating from the scope of the present invention.

Because access to the employee name, serial number, and date of hire is to be unrestricted, the values of these document elements will not be encrypted in the document to be returned to a document requester. Thus, the minimum security strength and community attributes of the policy object stored at location 332 are preferably set to null values (to indicate that encryption is not required).

Another policy used with the employee record example is to limit access to an employee's current salary to the employee himself, any managers of the company, and any employees within the company's human resources (HR) department. The URI for this policy has been given the entity name "empl_mgr_hr"311, and is specified 385 in the attribute list declaration for curr_salary 380. The stored policy object located at URI 312 will specify the encryption strength deemed to be appropriate for projecting this employee salary information from unauthorized access. The community attribute in the policy object will preferably comprise three distinguished name values one for the individual employee, one for the group comprising all managers, and one for the group comprising all employees in the HR department. (Alternatively, a separate DN entry could be specified for each member of the managers group and/or each member of the HR department, but as previously stated, it is preferable to represent all members of a group by a group DN when the group DN is available.)

The third policy of this example is used with the medical conditions information. Suppose that access to this information is to be restricted to the employee to which it pertains, and any employee working in the medical department. Information for enforcing this policy (including its element visibility restrictions), which has been given the entity name "empl_medical" 321, is stored at URI 322. The policy is associated with the medical_condition 390 element by specifying 395 the URI 322 through its entity name 321. The stored policy object located at URI 322 will specify the encryption strength appropriate for protecting the employee's medical_condition information, and the community attribute in the policy object will preferably comprise two distinguished name values—one for the individual employee and one for the group comprising all employees in the medical department. (As described above, a separate DN entry could alternatively be specified for each member of the medical group, without deviating from the scope of the present invention.)

The solution used in the preferred embodiments—of specifying a data policy URI within a data element's attribute list declaration—allows one to encode the most complex arrangement possible, that being a different policy and different element visibility for each data element (even though this situation is likely never to occur in actual use). As can be seen from the example DTD in FIG. 3, the preferred embodiments use standard DTD markups with a special convention. In this manner, processes unaware of the policy convention will still see totally valid XML syntax which passes all standard validation tests when the respective document contains policy markups. A beneficial side effect of this is that if the document generated by a data source uses a URI DTD reference (such as element 405 of document 400 in FIG. 4A, which refers to the storage location of the example DTD 300 of FIG. 3), then an enterprise data policy administrator can cause data policy and element visibility restrictions to be applied to such generated documents simply by modifying the referenced DTD (to add policy definitions and element visibility, or perhaps change the policy definitions and element visibility which have already been added). No change to the code which generates the XML source documents at the data source needs to be made to cause the appropriate encryption and access restrictions to be applied.

By convention, the DTD policy markup of the preferred embodiments uses a fixed attribute (see, e.g., 354 of FIG. 3) from a policy namespace (see 352 of FIG. 3) to indicate the URI of the policy which is to be applied to an XML element. As is known in the art, using a namespace prefix enables differentiation among tags that might otherwise be considered duplicates. Setting a fixed value guarantees that the value of this attribute (such as the value 355 of attribute 353) will be available to the XSL processor whenever it processes the element (such as the empl_name element 351).

FIG. 4A illustrates a simple source document 400 resulting from retrieval of the employee record information for a particular employee (identified by name at 402 and by serial number at 404), before the processing of the present invention has occurred. This source document 400 contains plain-text information for all document elements of the employee record, including the security-sensitive elements "curr_salary" 408 and "medical_condition" 410 (which are to be encrypted using the stored policy objects specified at 385 and 395 of FIG. 3, respectively). The example DTD of FIG. 3 would then be used by an augmented XSL processor, as described below, to apply the desired data policy and element visibility rules to produce a selectively-encrypted version of this document 400 before publishing the encrypted document or sending the encrypted document to the requesting client. Note that there is no policy markup nor any reference to policy in the document 400, and hence, as stated above, there was no need to modify the XML emitter of the document-generating application at the data source.

Skipping for now the discussion of FIG. 4B (comprising FIGS. 4B1 and 4B2) and proceeding to FIG. 4C (comprising FIGS. 4C1 and 4C2), a representative example of a selectively-encrypted document containing the information from source document 400 is shown at 450. Using the policy and element visibility examples discussed with reference to FIG. 3, if the requesting user is the employee 402, this user will be able to recover (i.e. decrypt) the protected values of both curr_salary 408 and medical_condition 410 from the encrypted fields 452, 454 (where these fields 452, 454 contain values used for illustrate purposes only) of document 450 which is transmitted in response to his request. In addition, because selectively-encrypted documents are not customized for a particular requesting user according to the present invention, but rather carry sufficient key distribution material to enable access by any authorized user, employee 402 will be able to recover the protected values 453, 455 from fields 452, 454 even if he was not the original requester of the encrypted document. Similarly, a user who is a manager in this company or who works in the HR department will be able to recover the value 453 of encrypted field 452 if he receives document 450, because these users are within the authorized community for corresponding document element 408, and a user in the medical department will be able to recover the value 455 of encrypted field 454. If a user who is not a manager, is not the individual employee, and does not work in either the HR or medical department receives encrypted document 450, this user will only be able to view the values of unrestricted document elements 402, 404, and 406, even though the values of the curr_salary and medical_condition elements are contained within this user's copy of the document 450. The manner in which an augmented style sheet processor applies the data policy and visibility rules to yield these results according to the present invention will be discussed below. (Style sheet processing may perform additional changes to source document 400 in the process of generating an encrypted document, such as formatting the employee record information into a predetermined layout or perform target-specific transformations unrelated to data policy and element visibility, using techniques which are known in the art and do not form part of the present invention.)

According to the preferred embodiments of the present invention, the process of selectively encrypting a document is implemented as two logical phases. The first phase is referred to herein as the "preprocessing" phase. The augmented DTD 300 described with reference to FIG. 3, a source document such as document 400 of FIG. 4A, and the stored policy objects and their visibility rules (not shown) are used as input to the preprocessing phase. The second phase is referred to herein as the "post processing" phase. Encrypted document 450, including its embedded key distribution material 460, is generated as a result of the post processing phase.

FIGS. 5A–5C show preferred embodiments of the format of records or objects (referred to hereinafter as "objects" for ease of reference) that are created and used during the processing of the present invention to perform the selective encryption technique disclosed herein, and which are also used during the corresponding decryption processes. The content and format of each of these objects will now be described. (The manner in which these objects are created and used during the processing of the preferred embodiments will be described in more detail below with reference to the logic in FIGS. 7–12.)

FIG. 5A depicts the layout of an object referred to herein as a "key object". According to the preferred embodiments, one version 500 of this key object is used internally by the encryption processing of the present invention, and a second version 510 is transmitted along with the encrypted object with which it was used. Both versions 500, 510 include one distinguished name (DN) 501. Version 500 of the key object includes an X.509 certificate 502a corresponding to this DN, while version 510 replaces the certificate with a "keyIdentifier" 502b (see RFC 2459, "Internet X.509 Public Key Infrastructure Certificate and CRL Profile") which can be used to locate the certificate 502a in conjunction with the DN via a directory or other repository. Finally, both versions 500 and 510 include an encrypted symmetric key 503. The X.509 certificate 502a contains the public key 505 that was used to create the encrypted symmetric key 503 (as will be discussed in more detail below). The entity named in the certificate's "subject" field 504 owns the private key corresponding to public key 505, and can use this private key to decrypt the symmetric key 503. (Note that the value of the certificate's subject field 504 may be different from the value of the DN field 501.) The keyIdentifier 502b is a shorthand "fingerprint" that can be used to identify the certificate 502a to which it corresponds, for example, when searching through the certificates in a key ring or chain, or when searching through certificates returned by a directory or database search. As is well known in the art, X.509 certificates are quite large. Using the shorthand notation 502b when transmitting an encrypted document saves space in the encrypted document, while conveying semantically equivalent information. However, the entire certificate 502a may alternatively be transmitted with the encrypted document, rather than using version 510 of the key object and its key identifier 502b, without deviating from the inventive concepts disclosed herein.

As is known in the art, some secure transmission protocols require one digital certificate for encrypting data, and another for use in creating a digital signature. The preferred embodiments of the present invention assume an SSL session is being used, wherein only a single certificate is needed. It will be obvious to one of skill in the art how the description of the preferred embodiments must be modified when using two different certificates. In such two-certificate cases, the certificate 502a represents the encryption certificate.

Key objects 500, 510 are initially built during the preprocessing phase of the present invention. The encrypted symmetric key value 503 is created in the post processing phase.

FIG. 5B shows the format of an object referred to herein as a "preprocessing key class" object 520. Preprocessing key class objects are used internally by the present invention during both the preprocessing and post processing phases. Each preprocessing key class object 520 comprises an encryption strength identifier 521 (which can be resolved to identify a particular encryption algorithm and a key length, for example by consulting a directory or lookup table), a key class 522, and an unencrypted symmetric key 523. The value of symmetric key field 523 is created during the post processing phase.

FIG. 5C depicts the format of an object referred to herein as a "key class" object 530. A key class defines a community that is authorized to access an element, and the type of encryption to be performed on that element. More than one element may share a single key class, provided the community members are identical among the sharing elements. Each key class object 530 comprises an identification of the key class 531, an encryption algorithm identifier 532 (identifying the algorithm to be used for document elements associated with this key class 531), a key length 533, an optional field 534 specifying any other hints that may be needed to execute the algorithm, and one or more key objects (depicted generally in FIG. 5C as 535, 536, . . . 539).

Key class objects 530 corresponding to each preprocessing key class object 520 are built during the post processing phase, and inserted by the post processing phase into the DOM root of the document which has been encrypted using these key class objects. (See reference numbers 461, 462 of FIG. 4C.)

A key object 535, 536, . . . 539 will exist in a particular key class object 530 for each community member within the key class 531. Recall that a key object 500 or 510 is created for each DN 501, and that each such key object includes an encrypted symmetric key 503. Thus, a key class object 530 for a key class 531 having 3 community members will include 3 key objects 535, 536, 539, and therefore will have 3 different encrypted symmetric key values 503 (that is, a different symmetric key value for each community member). For the employee record example where the individual employee, managers, and HR department employees comprise the 3 members of the authorized community for viewing current salary information, key class object 530 will include key objects with distinct encrypted keys 503 for each of these members. These 3 different symmetric key values are created from the single unencrypted key value 523 stored in the preprocessing key object 520. The public key 505 from the key object for each community member is used to generate the different symmetric key values. To decrypt the curr_salary information, the processing on behalf of a member of the managers group locates the managers key object among objects 535, 536, 539 by comparing the managers group DN to DN values 501, retrieves the encrypted symmetric key value 503 from the appropriate key object, and decrypts this symmetric key using the private key for the managers group. This decrypted key can then be used to decrypt the curr_salary information. Similarly, when a member of the HR department wishes to access the curr_salary, the DN for the HR group is compared to the DN values in objects 535, 536, 539 to locate the key object for the HR group. The encrypted key value 503 is then retrieved from that key object, and decrypted with the HR group's private key. This decrypted symmetric key is then used by the HR group member to decrypt the curr_salary value.

It is in this manner that selectively-encrypted documents created according to the present invention securely distribute key material that can be used for decryption by an audience that is unknown at the time of document creation.

Figure 6:
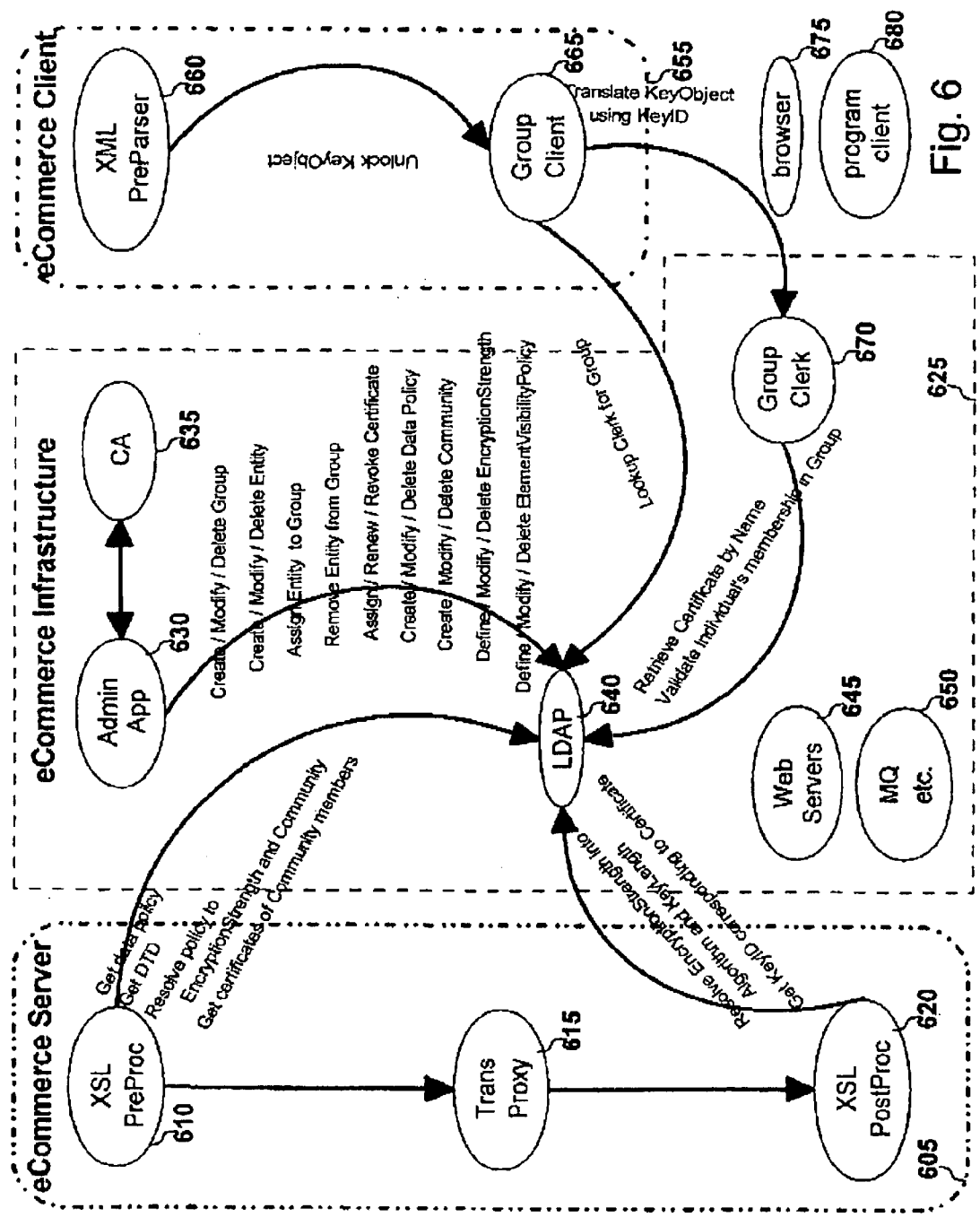
FIG. 6 provides an overview of the components involved in the preferred embodiments of the present invention, and the general data flows between them.

The preferred embodiments of the present invention will now be discussed in more detail with reference to FIGS. 6 through 12. FIG. 6 provides an overview of the software components used in several of the preferred embodiments. FIGS. 7–12 depict the logic that may be used to implement the preferred embodiments.

In FIG. 6 there are shown an electronic commerce ("eCommerce") back-end server 605, an electronic commerce infrastructure 625, an electronic commerce client 655 (sometimes also referred to as a server, when acting in its role as proxy on behalf of a browser client), a standard browser client 675, and a program client 680. Three processes are shown in the eCommerce server 605: an XSL preprocessor 610 and an XSL postprocessor 620 according to the present invention, and a transcoding proxy 615. The XSL preprocessor 610 performs the preprocessing phase of the encryption process, and the XSL postprocessor (which may be the same software component as the preprocessor 610) performs the post processing phase. Processes contained within the eCommerce infrastructure 625 include an administrator application 630, a Certificate Authority 635, an LDAP directory 640, various web servers 645, a message queuing or other transport infrastructure 650, and a group clerk 670. Processes within the eCommerce client 655 include an XML preparser 660 (defined by the present invention to decrypt selectively-encrypted documents, as will be described in more detail) and a group client 665. In one embodiment of the present invention, program client 680 is part of eCommerce client 655. Alternatively, program client 680 can be an independent entity analogous to the browser client 675, served by the eCommerce client 655 in its server role.

Note that while several components of FIG. 6 are described in terms of "eCommerce", this is for purposes of illustration and not of limitation. The present invention may be used advantageously with documents having security-sensitive information that is not commercial in nature.

The function of the eCommerce back-end server 605 is to create selectively-encrypted documents, and in particular, selectively-encrypted XML documents. In the preprocessing phase, the XSL preprocessor 610 queries the directory 640 to obtain the DTD as well as data policies and visibility rules for various document elements. While the preferred embodiments use an LDAP directory as previously stated, it will be understood by those skilled in the art that some other type of directory or data repository could be substituted without deviating from the scope of the present invention; accordingly, an LDAP directory 640 is used for purposes of illustration and not of limitation. The preprocessor 610 also queries the LDAP directory 640 to resolve those policies into a specific encryption strength (e.g. an enumerated value) and a community, and to obtain the X.509 certificates belonging to community members. At the conclusion of the preprocessing phase, preprocessor 610 passes a working representation of the data, such as a DOM tree representation thereof to the next processing stage, such as a transcoding proxy 615, if present, for further processing, otherwise directly to the XSL postprocessor 620. The intermediate stage 615 passes its completed output to the XSL postprocessor 620 defined according to the present invention. During the post processing phase, XSL postprocessor 620 contacts the LDAP directory 640 to resolve encryption strength to a specific encryption algorithm and key length (if this information was not directly specified in the policy object), and to obtain a key identifier corresponding to an X.509 certificate. When the selectively-encrypted XML document has been built by eCommerce Server 605, the document is made available to users who may request it (such as by storing it on Web servers 645), sent to other locations using a transport mechanism such as message queuing 650, and so forth.

The transport and storage details are not germane to this invention, other than the observation that since any sensitive parts of the document are now encrypted, there is no need for message queuing or other servers or agents who will handle the XML data to have special encryption support to protect the document's contents; the security-sensitive document elements are already protected. Furthermore, agents that need to examine specific document fields, e.g. for transaction routing purposes, can either be authorized to decrypt only those fields, or those fields can be left in the clear.

An administration application 630 defined according to the present invention (to be discussed in detail below with reference to FIG. 12) interacts with the LDAP directory 640, the certificate authority 635, the browser client 675, the program client 680, the group clerk 670, and the eCommerce client 655 in performing its functions. As will be more fully explained with reference to FIG. 12, the administrator can create, modify, or delete a group; create, modify, or delete an individual entity (such as a browser client 675, a program client 680, an electronic commerce client 655 acting in its capacity as a proxy/server for a browser client 675, or a group clerk 670); assign an entity to a group; remove an entity from a group; reassign, renew, or revoke a certificate for a group or an individual entity; create, modify, or delete a data policy; create, modify, or delete a community definition; create, modify, or delete an encryption strength definition; create, modify, or delete element visibility information in a data policy; or create, modify, or delete a DTD.

XML preparser 660 attempts to decrypt selectively-encrypted XML data. For key objects locked using a group key, preparser 660 contacts a local group client 665 component. The group client 665 contacts the LDAP directory 640 to locate the clerk defined for the group. Then the group client 665 contacts the group clerk 670 to get the key object deciphered. The group clerk 670 contacts the LDAP directory 640 to ascertain the X.509 certificate(s) associated with the requester and its agents (one or more of the following: the eCommerce client 655 itself acting on its own behalf or as a proxy, the browser client 675, and/or the program client 680). Clerk 670 also queries the LDAP directory 640 to validate whether a given entity is a member of a given group. In one embodiment of the present invention, the group clerk 670 and the eCommerce client 655 are implemented on the same hardware platform.

Figure 7A:
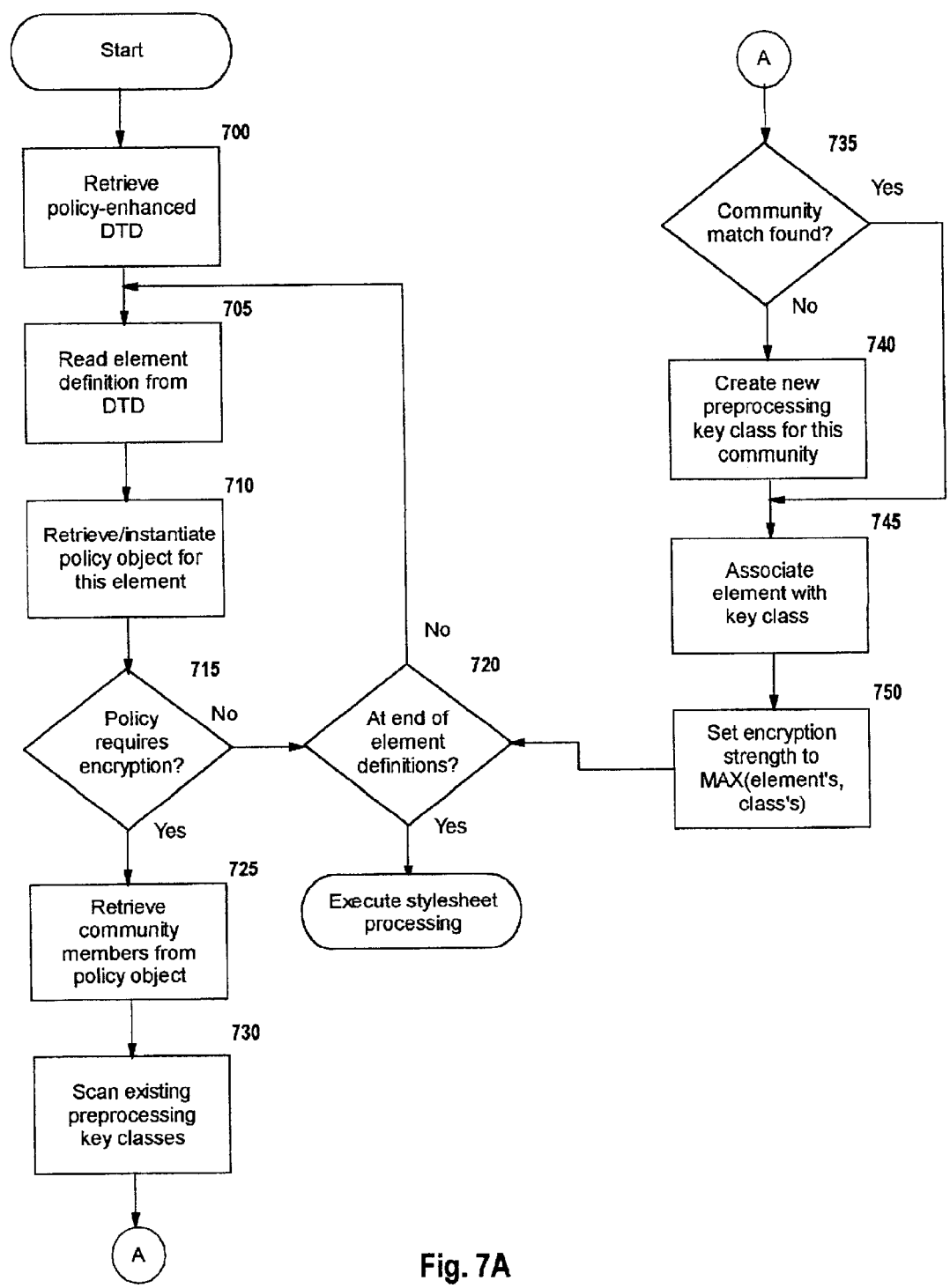
Figure 7B:
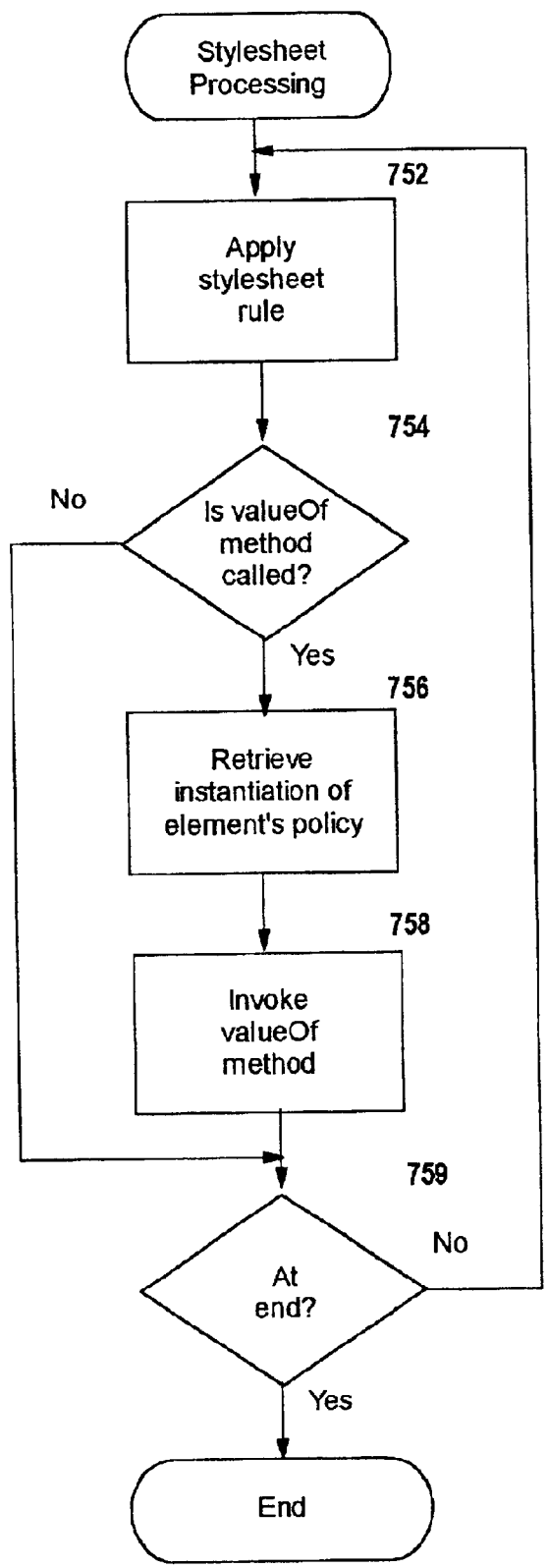
Figure 7C:
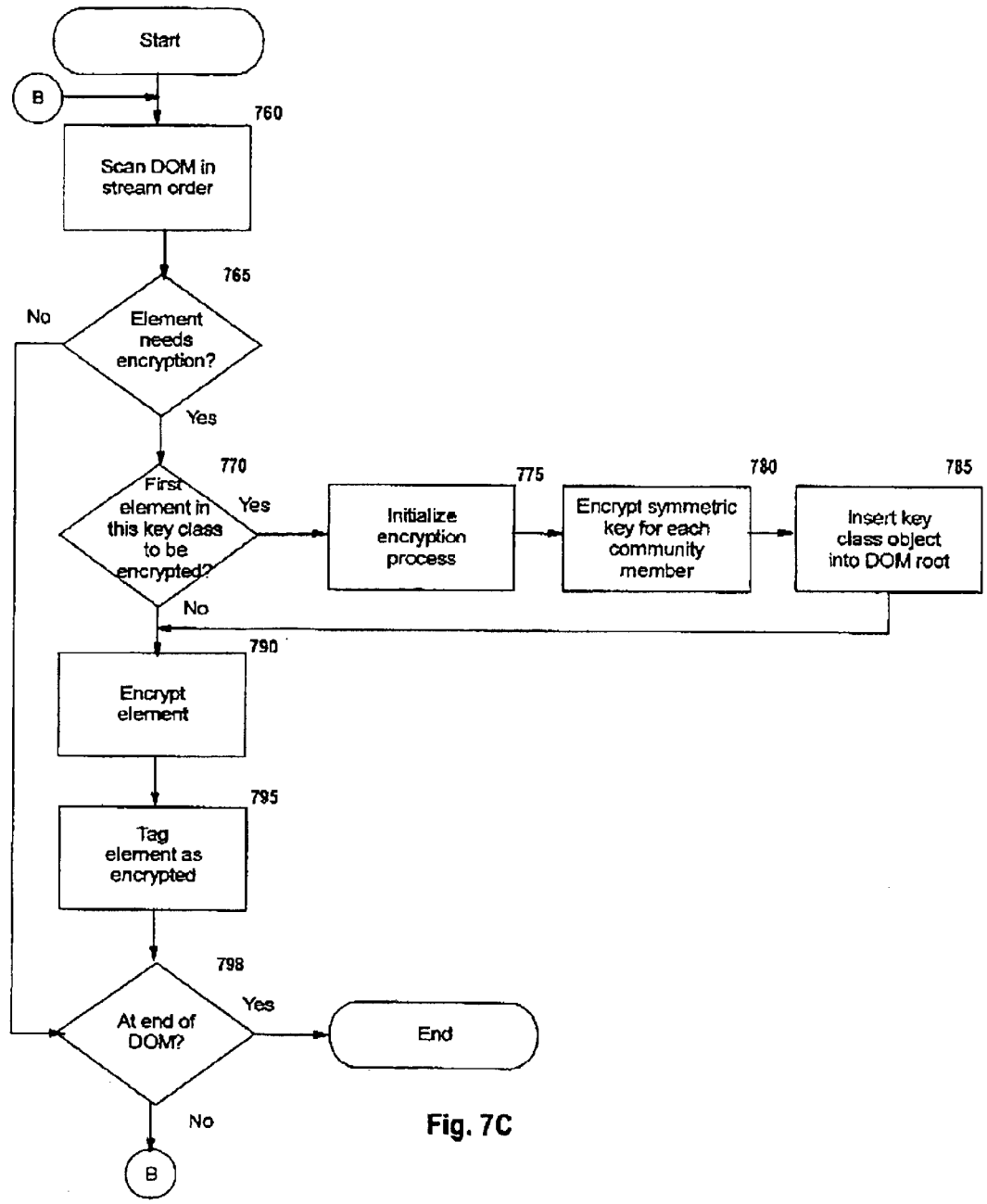
Figure 8A:
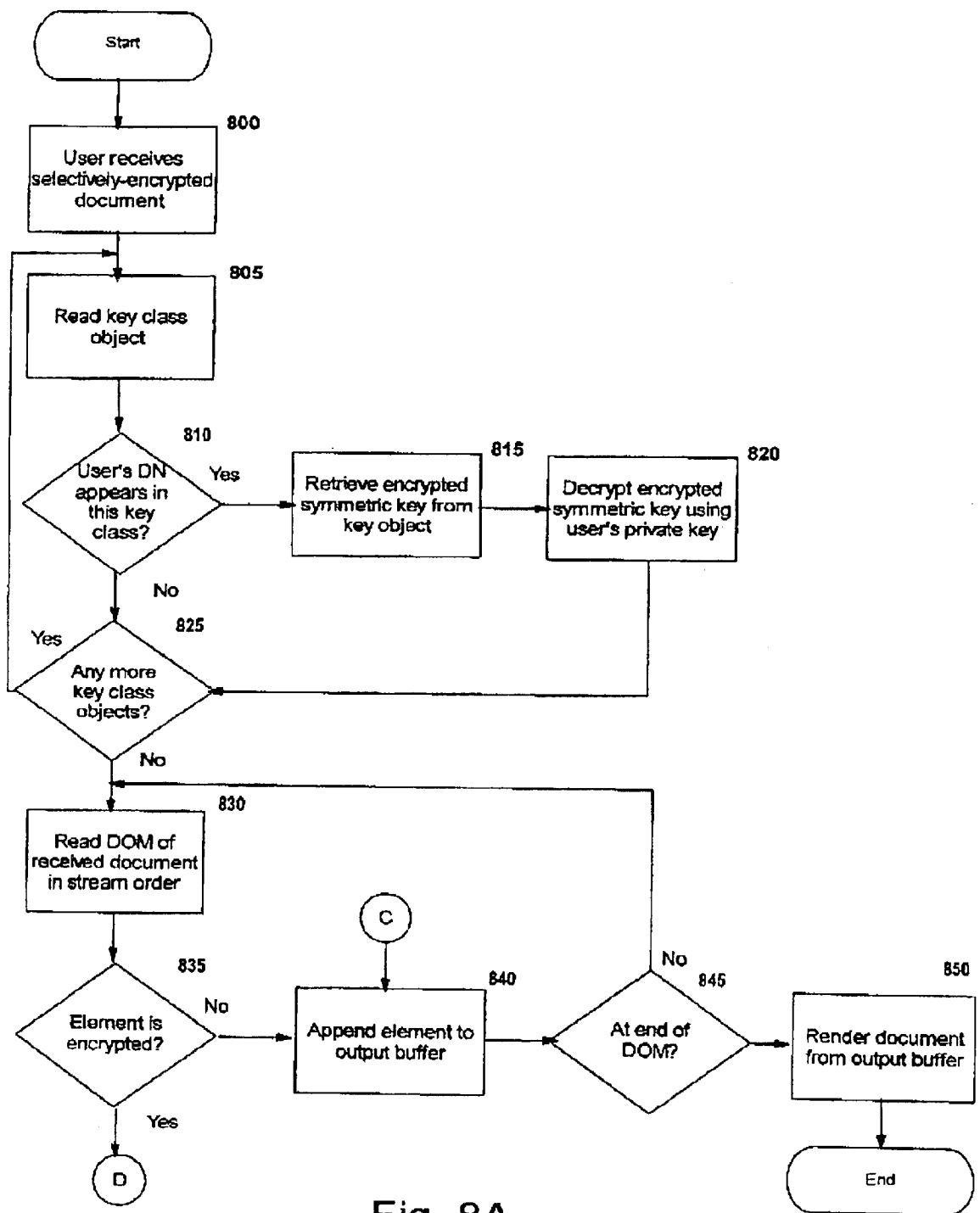
Figure 8B:
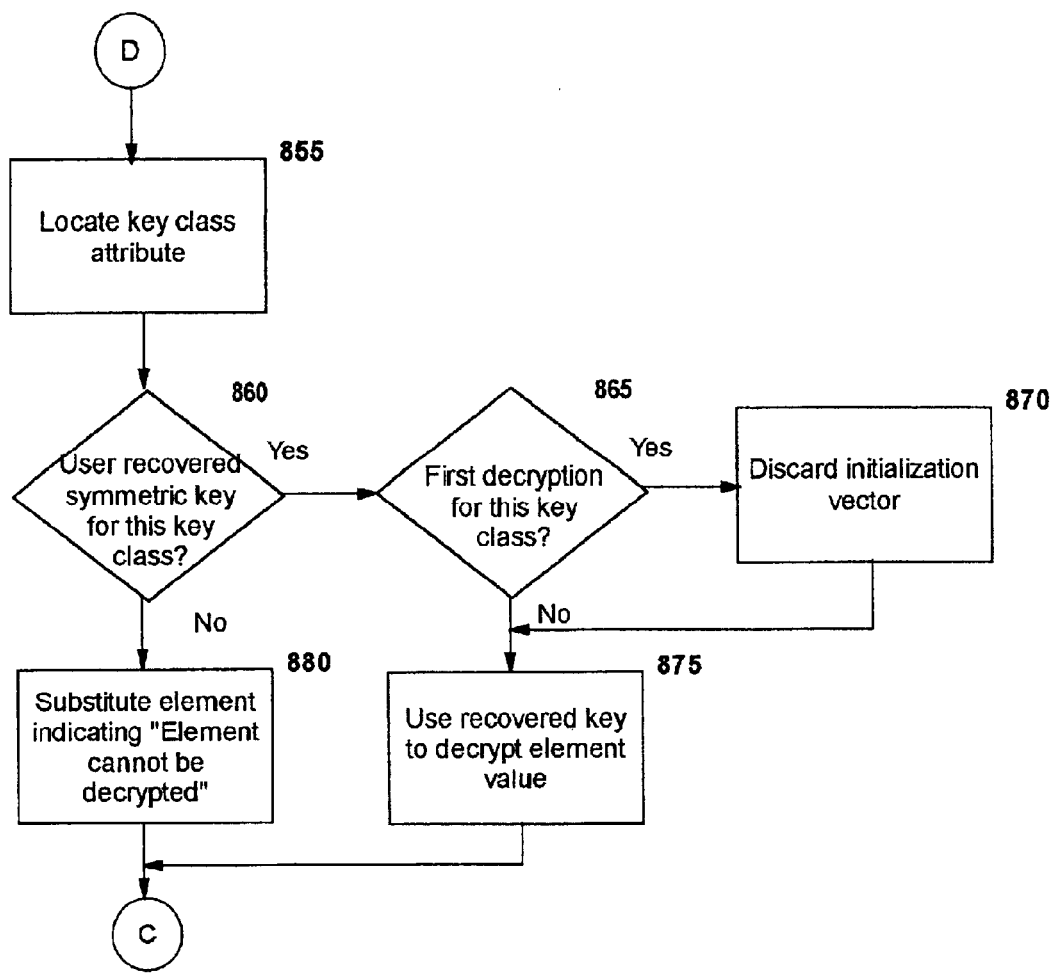
Figure 9A:
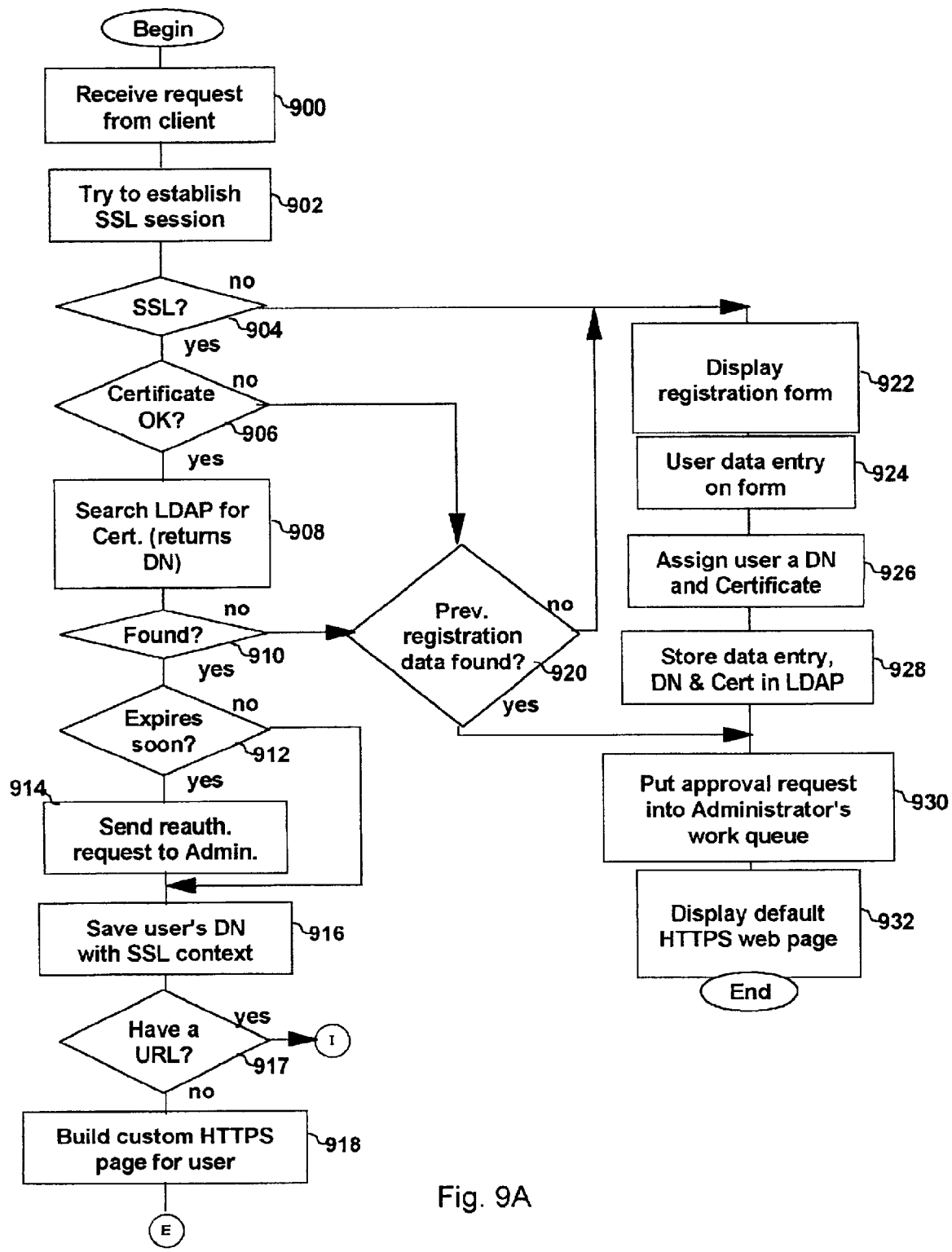
Figure 9B:
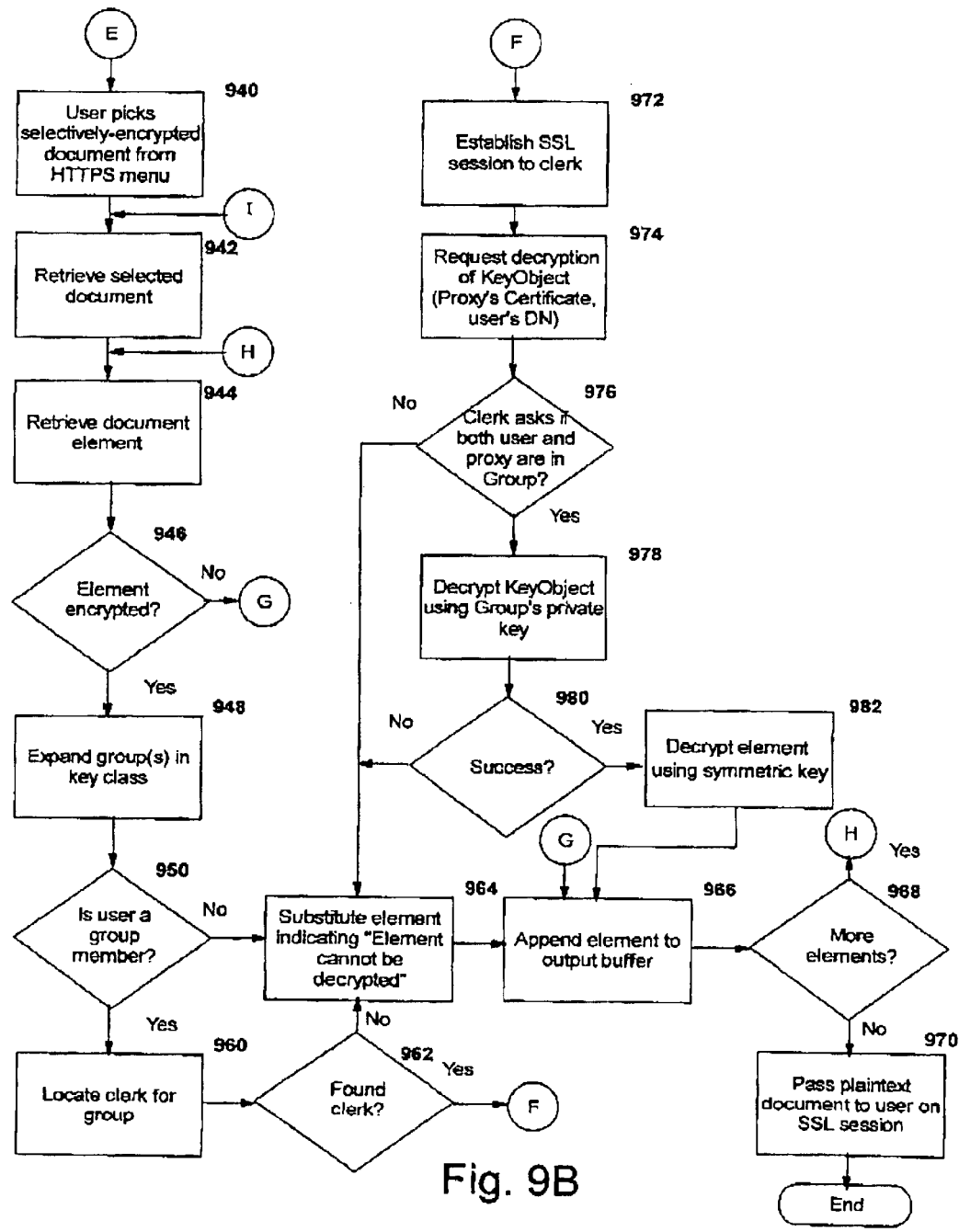
Figure 10A:
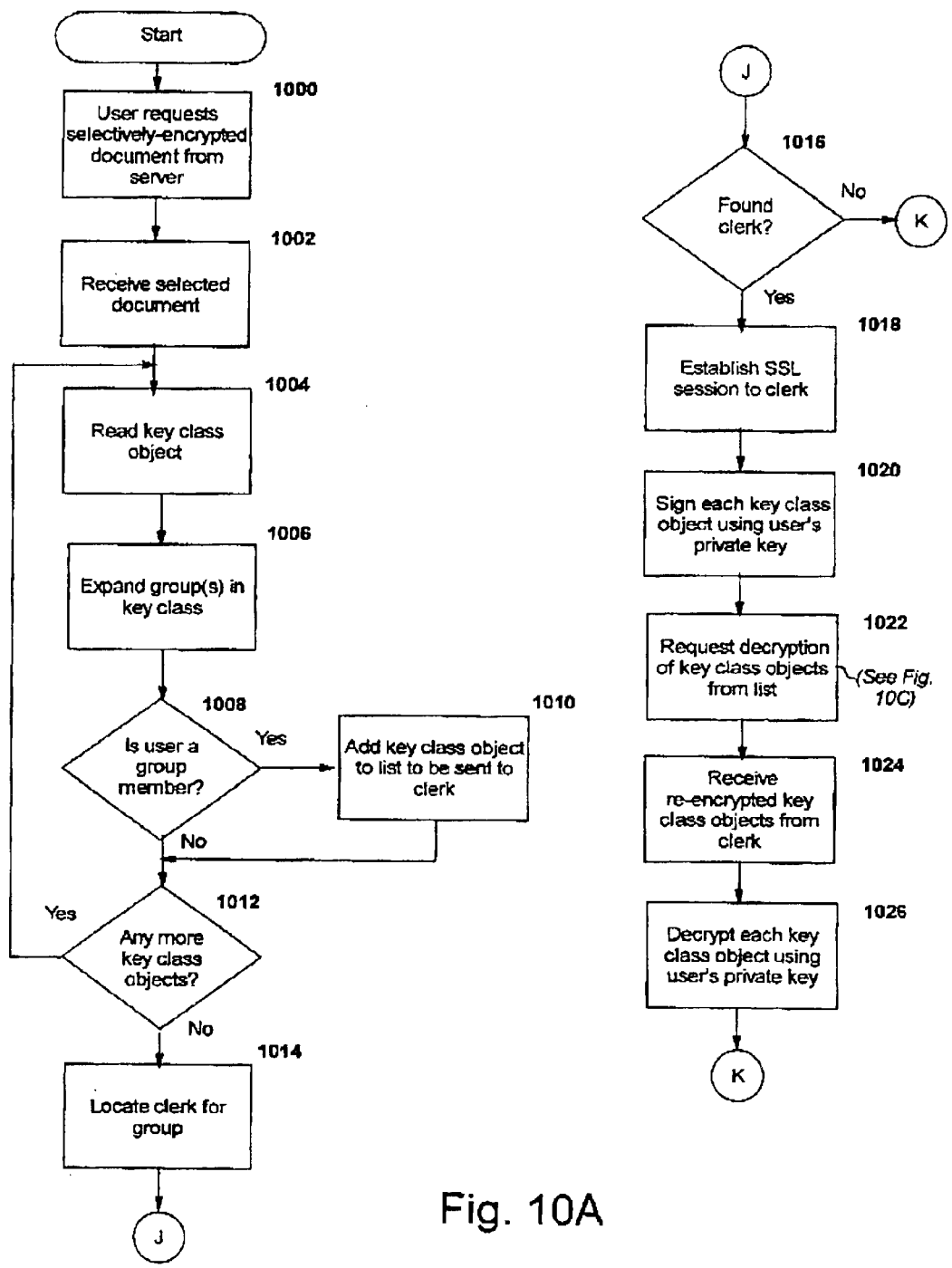
Figure 10B:
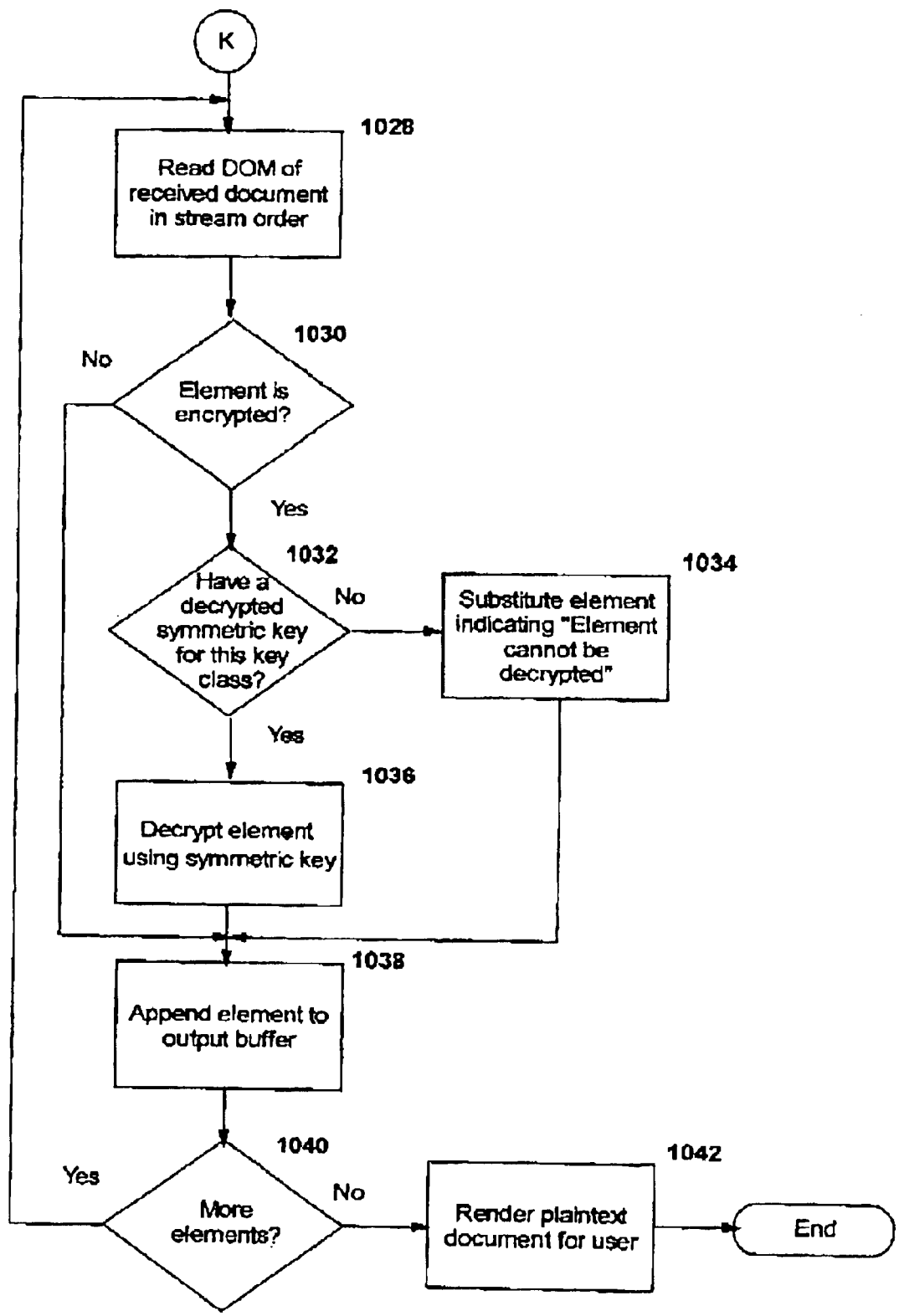
Figure 10C:
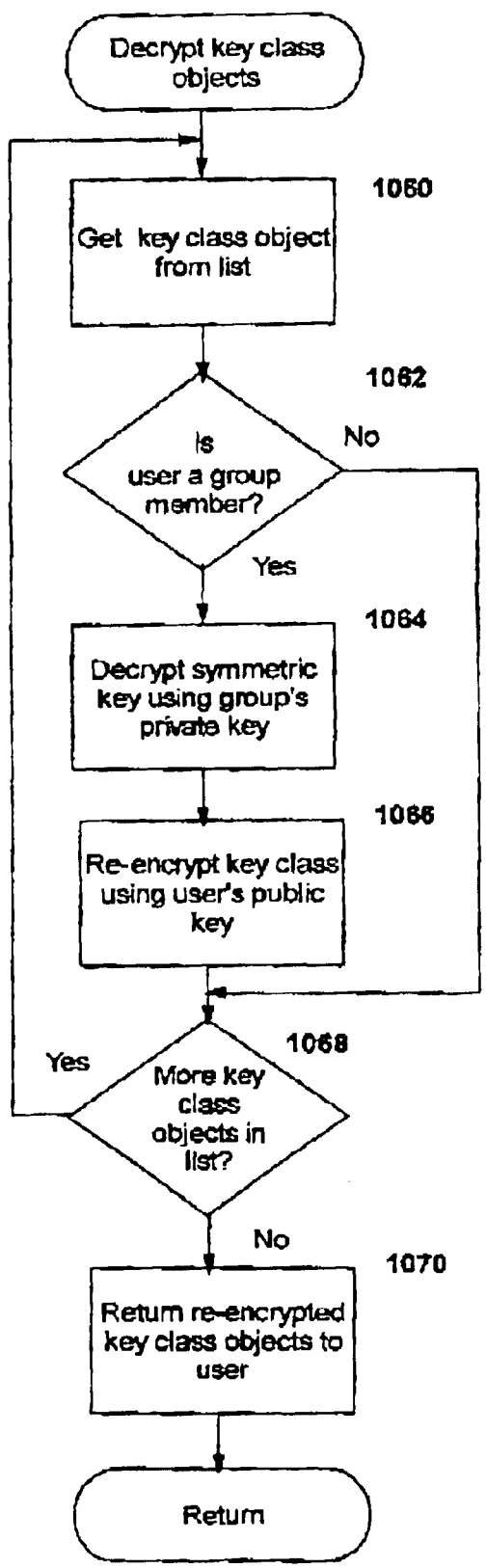
Figure 11A:
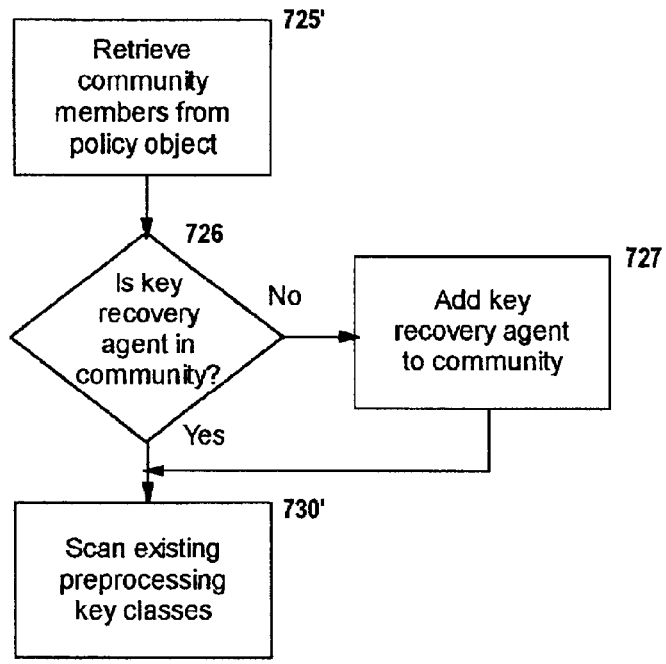
Figure 11B:
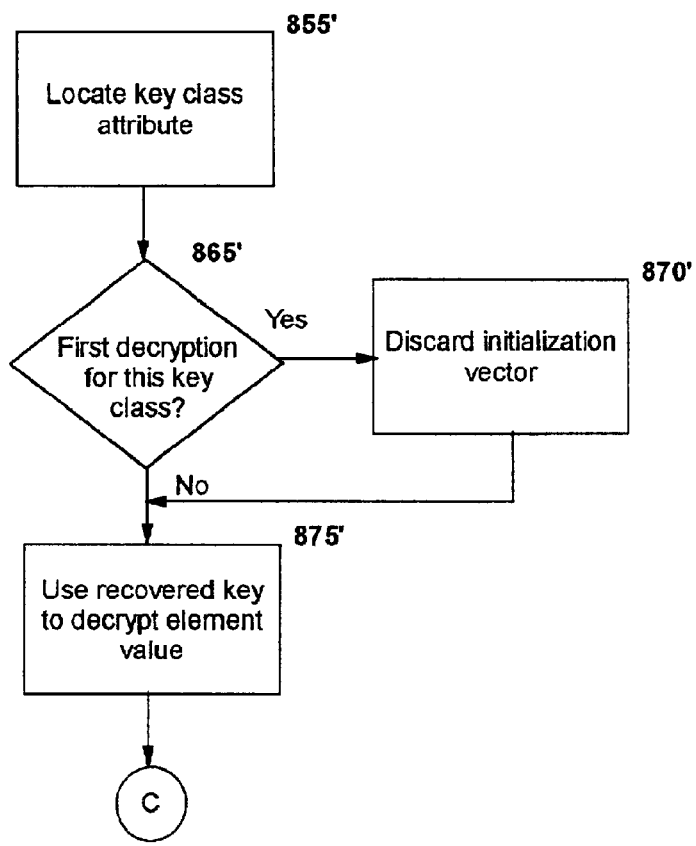

The logic with which the preferred embodiments of the present invention may be implemented will now be discussed with reference to the flowcharts in FIGS. 7–12. FIGS. 7A–7C depict the process with which a document may be selectively encrypted, according to the present invention. In one preferred embodiment, an individual user (who may be an authorized member of at least one community for which the document was selectively encrypted) receives the encrypted document on his client workstation, and executes a decryption process on that workstation. This scenario is illustrated in the logic of FIGS. 8A and 8B. In another preferred embodiment, a user's workstation may have insufficient processing power to perform the decryption process of the present invention, or it may be desirable to avoid changing the user's workstation environment such that the code of the present invention can be executed locally, so a client proxy performs the decryption process on behalf of the user. This scenario is illustrated in the logic of FIGS. 9A and 9B. In yet another preferred embodiment, the encrypted document is received by a member of a group, where the group may be an authorized member of a community which has access to at least one element of the selectively-encrypted document. The manner in which the decryption process is performed for this embodiment is depicted in FIGS. 10A through 10C. In another preferred embodiment, an authorized user such as a systems administrator may need to recover the keys which were used to encrypt a document which may have been stored, e.g., in a company repository maintained for legal purposes. The manner in which this key recovery is advantageously performed according to the present invention is shown in FIGS. 11A and 11B. Finally, FIG. 12 depicts the logic with which an administrator or administration process sets up and administers the secure document system of the present invention.

Encryption

The selective encryption process depicted in FIGS. 7A–7C operates in logical phases, as previously described, a preprocessing phase and a post processing phase. During the preprocessing phase (FIG. 7A), data policies and element visibility restrictions are loaded from stored policy objects and analyzed. Standard style sheet processing is then invoked (FIG. 7B) to mark those elements in the source document which require encryption. (Alternatively, the processing of FIG. 7B may be performed by the augmented style sheet processor of the present invention, as an extension of the code written to perform the preprocessing phase.) Finally, during the post processing phase, encryption is applied to the elements which have been tagged and the key distribution material is inserted into the DOM tree for distribution with the selectively-encrypted document (FIG. 7C).

The preferred embodiments of the present invention perform the selective encryption process using an XSL processor that has been augmented to apply data policy and element visibility restrictions, as previously stated. FIGS. 7A and 7C illustrate flow charts depicting the additional logic with which this specially-instrumented XSL processor operates. (The logic of the existing XSL processing has not been shown. It will be obvious to one of skill in the art how to incorporate the logic of FIGS. 7A and 7C into the existing XSL processor logic.)

The purpose of the preprocessing phase depicted in FIG. 7A is to determine the elements of the source document to be encrypted, and to build the key classes to be used during the encryption process. The processing of this phase begins at Block 700, and operates upon a particular source document (such as document 400 of FIG. 4A). This process may be invoked in response to a client request for the document (as part of the process of returning the requested document to the client), or in advance of such a request (where the resulting encrypted document will then be stored to await a subsequent client request). Note that references herein to a requesting "client" refer equally to the case where the response is to be delivered for rendering to a human user or where the response is to be delivered to an executing application program or process.

In Block 700, the policy-enhanced DTD for the source document is retrieved from a directory or other storage repository. The preferred embodiments assume that data policy is stored in a repository (such as the LDAP directory referenced by policy URIs 312, 322, 332 of FIG. 3) as executable policy object code. Using the examples of FIGS. 3 and 4, the document being processed is source document 400 of FIG. 4A. The DTD reference 405 is located by the processing of Block 700, and this reference 405 is used to retrieve the DTD 300. Block 705 then retrieves an element definition (such as the empl_name definition 350) from the DTD. Block 710 retrieves (using the URIs such as 312, 322, and 332) and instantiates the policy object referenced from the DTD element definition.

A policy object is preferably written for each specific element type to be processed, whether the element is to be encrypted or not. As defined in the referenced invention, each policy object preferably operates by specifying executable code to overload existing XSL processor methods, and is written to be executed as a "plug-in" to the XSL processor (wherein the plug-in concept is well known in the art). In particular, the preferred embodiments overload the XSL "value-of" method. Preferably, this overloading will be done by subclassing the existing value-of method (where the technique for subclassing a method is well known in the art). References to values are then intercepted during the style sheet application process (FIG. 7B), and these intercepted values are passed through to the policies instantiated in Block 710. The encryption attributes and techniques defined in the present invention may be used in addition to, or instead of, the attributes and techniques defined for policy objects in the referenced invention whereby the value of an element could be altered (e.g. by changing numeric values to text, suppressing elements and values, etc.) during style sheet processing. (Note that it may be desirable to create an audit log during this processing, to reflect the original data values encountered as well as the data resulting from such value alterations. Techniques for creating audit logs are well known in the art, and do not form part of the present invention.)

Each policy object used by the preferred embodiments of the present invention preferably includes a method or attribute that specifies the minimum security strength required for encrypting the document elements with which this object is to be used, and the members of the community authorized to view (i.e. decrypt) the value of this document element. The programmer creating the policy object code is responsible for specifying this strength and community information. The community may be specified statically, by including a list of the DNs of its members who can be determined in advance, and/or executable code may be written in the policy object to determine one or more DNs of community members dynamically. When a group is to be specified as a community member, the programmer will preferably specify a DN of the group (if one is available); otherwise, the DN of each member may be (statically) specified, although this latter approach results in more time-consuming execution during the encryption and decryption processes, and does not respond to additions or changes in group membership unless the statically-specified list in the policy object is updated. Or, code may be written in the policy object to dynamically locate and return the DNs of each member of a particular group.

Block 715 asks whether this policy object specifies encryption of its associated data elements. This may determined by invoking a method that returns an attribute value specifying the minimum encryption strength required, where a null value indicates that encryption is not required and a non-null value indicates that encryption is to be used. Alternatively, a method may be invoked which returns a Boolean attribute value which has been set specifically (that is, without regard to the encryption strength attribute) to indicate whether encryption is required. If the test at Block 715 has a negative result, control transfers to Block 720 to see if this was the last element definition. If it was, then the processing of FIG. 7A ends, and control continues to the processing of FIG. 7B. If this was not the last element definition, control returns to Block 705 to read and begin processing the next element definition.

Control reaches Block 725 when the test in Block 715 has a positive result. Block 725 retrieves the community information associated with this policy object, preferably by invoking a method such as "communityMembers" which returns a list of distinguished names. In the employee record example used in FIGS. 3 and 4, the policy object for the "empl_mgr_hr" policy may use statically specified DNs for the manager and HR groups, but must include executable code to dynamically determine the DN for the particular user whose information is represented in document 400. The static DNs may be specified within the stored policy object in a format such as:

DN="cn=managers,ou=groups,o=acme" for the manager group, and

DN="cn=hr,ou=groups,o=acme" for the HR group.

A DN for an individual user (such as a systems administrator) may also be statically specified, using a syntax such as:

DN="cn=admin,ou=users,o=acme"

By inspection of the syntax of these examples, it can be seen that the distinguished names are structured with an organization entry for Acme company ("o=acme") at the root level, where the root level is further divided into "users" and "groups" at the organizational unit ("ou") level, and where the "groups" level is then further divided to have entries for "managers" and "hr" at the common name ("cn") level. The DNs for a group such as the managers group and HR group may be used to retrieve DNs for each member of those groups using techniques which are well known in the art and do not form part of the present invention. Using this same format, the DN for the medical department used in the "empl_medical" policy object may be specified within the stored policy object as:

DN="cn=medical,ou=groups,o=acme"

where the "groups" level also has an entry for a group denoted as "medical".

A DN for an individual user that is dynamically retrieved has a similar syntax to that used for statically specified DNs. Depending on how the registry of DNs is organized, the user's DN in the employee record example may be located using his name and serial number, or perhaps just his serial number, etc. The executable code in the policy object must therefore scan the source document 400 (or other information source such as a request header with which the source document was requested, as appropriate) to locate the value (s) to be used (such as searching for the values of the "empl_name" 402 and/or "ser_nbr" 404 tags).

Block 730 compares the list of distinguished names for all members of this community to the lists of DNs of community members in the existing preprocessing key class objects (where each DN 501 is contained in a key object 500 within a key class object 530, this key class object 530 being represented at field 522 of each preprocessing key class object 520).

If a preprocessing key class object 520 is not found which already contains this community (a "No" result at Block 735), then a new preprocessing key class object is created (Block 740). The encryption strength field 521 of object 520 is set to the value of the minimum strength attribute of the policy object retrieved in Block 710. The unencrypted key value 523 is preferably set to a null value, indicating that it has not yet been initialized. A key class object 530 is then created, and used as the value of field 522. The identifier 531 to be used for the key class is preferably generated as a sequentially-increasing numeric value. Fields 532, 533, 534 are preferably set to null values at this point: the actual values will be determined during the post-processing phase. A key object 535, 536, . . . 539 is then added to key class object 530 for each community member. Preferably, the DN for each community member will be used to search already-created key objects 500. If a match is located, the existing key object 500 (having the community member's DN in field 501, the community member's X.509 certificate in field 502, and a null value in field 503) will be used in the key class object 530. Otherwise, when a matching key object does not already exist, one must be created. The DN for the member will be used to retrieve the member's X.509 certificate. The new key object 500 will be created by setting field 501 to the member's DN, field 502a to the retrieved certificate, and field 503 to a null value.

Upon reaching Block 745, either a new preprocessing key class has been created for the community, or an existing preprocessing key class for the community has been located. Block 745 then associates this preprocessing key class object 520 with the policy object retrieved in Block 710. Block 750 replaces the encryption strength field 521 with the most restrictive of (1) the minimum required strength from the policy object and (2) the existing value of field 521 (referred to in Block 750 as the element's strength and the class's encryption strength, respectively). Encryption strengths may be represented as numeric values, where a higher number indicates a stronger encryption strength. In this case, Block 750 chooses the larger of the two numbers. The preprocessing key class object now contains the encryption strength needed by the element of class 531 that has the strongest encryption requirement. (This may result in over-encryption of some elements, which is acceptable.) Control then transfers to Block 720, to determine whether there are more element definitions to be processed.

The processing of FIG. 7B begins upon completion of the processing of FIG. 7A. This processing may occur as part of the augmented XSL processor of the present invention, or may be performed by a transcoding proxy of the prior art (see description of a transcoding proxy 615 in the discussion of FIG. 6, above). Block 752 applies a style sheet rule to the source document 400. When the pattern of a style sheet rule matches an element of the source document, Block 754 asks whether this template calls the existing XSL value-of method. If not, processing of the rule continues according to the prior art, and control transfers to Block 759. According to the present invention, the value-of method is preferably invoked for each element in the source document, in order to apply selective encryption to each element as needed. This may be accomplished by applying a style sheet that copies all input values to an output document being generated. When the value-of method is invoked by the template rule, Block 756 retrieves (i.e. obtains a pointer or reference to) the previously-instantiated data policy object for the data element which has matched the template rule. The overriding value-of method of this data policy object is executed at Block 758, performing any appropriate transformations that have been coded within this method. According to the present invention, the code of the overridden value-of method is written to determine whether the policy object specifies that the data element is to be encrypted (as described above with reference to Block 715), and if so, to insert encryption markup tags around the element. The encryption markup tags preferably use a syntax such as as "<encrypt:data class="n">" and "</encrypt:data>" (as illustrated in FIG. 4B at 422 and 424), where the value of "n" is set to the identifier of the key class object that was associated with this policy object in Block 745 of FIG. 7A. This process of applying style sheet rules to mark up the source document 400 is repeated by iterating Blocks 752 through 759 until the source document has been completely processed (i.e. until the test at Block 759 has a positive result), after which the processing of FIG. 7B ends.

FIG. 4B illustrates an example of the result of comprising the processing of FIG. 7B upon source document 400. Note that the content 420 of FIG. 4B represents interim information which is created and used internally. The information is never exposed in this form (See FIG. 4C for an illustration of the information that is exposed externally.) Markup tags 422 and 424 have been inserted to bracket the security-sensitive values of the curr_salary and medical_condition document elements. A first key class is to be used for encryption of the curr_salary value, and a second key class is to be used for the medical_condition value, as indicated in the markup tags at 423 and 425, respectively. FIG. 4B further illustrates the organization of these key class objects. As shown at 430, key class "1" has an associated algorithm (shown in the figure as type=3DES") and key length (shown in the figure as len="168"), and includes key objects 431, 432, 433 for the three members of the associated community. Key class "2" is similar, using a different algorithm and key length (see 440), and specifying key objects 441, 442 for two community members.

Note that the "tempkey" elements 434, 444 of FIG. 4B depict examples of the unencrypted symmetric key 523 that will be used to create a different encrypted symmetric key 503 (shown in FIG. 4B and 4C as the values of the "Ekey" attribute) for each community member of the associated key class. Note also that the KeyIdentifier values and these Ekey values depicted in the key classes (in both FIGS. 4B and FIG. 4C) are merely to allow visual representation. In an actual implementation, this information is preferably encoded as binary values using "base 64" rules as known in the art, such that the result contains only printable characters that are allowed in the context of the XML attribute values.

FIG. 7C depicts the post processing phase of the selective encryption process. This logic is invoked upon completion of the processing of FIG. 7B. The object of the post processing phase is to replace certain DOM elements with encrypted elements, and to insert the key objects necessary for decryption into the DOM root. FIG. 4B represents, without DOM tree structure, the interim document format 420 upon which the post processing phase operates.

As indicated in Block 760, the DOM tree corresponding to the document being encrypted is scanned in a predetermined order. According to the preferred embodiments, this order is defined to be the standard sequence for sending the DOM in an output stream. Having a predetermined order is required for the preferred embodiments, which use cipher block chaining in which the output of each block encryption serves as key material for the next block encryption. (If the order of scanning the DOM were varied rather than using a predetermined order, the receiver would be unable to decrypt the data as it would be unable to construct the interim keys.) Cipher block chaining (CBC) mode is preferred for use in the present invention over a non-chained mode to foil certain kinds of cryptographic attacks. Likewise, CBC is preferred over a stream cipher, to disguise the length of the encrypted fields, so as to thwart other types of cryptographic attacks. However, an alternative cipher mode such as a block cipher or stream cipher, performed on a per-element basis, may be used without deviating from the inventive concepts of the present invention.

Block 765 checks the element tag which has been parsed by Block 760 to determine whether this tag was marked (by Block 758 of FIG. 7B) as requiring encryption. If not, then control transfers to Block 798, bypassing the encryption process of Blocks 770 through 795. Otherwise, when the element tag indicates that the element is to be encrypted, processing continues to Block 770. Block 770 reads the key class from the element tag, such as the value "1" specified at 423 in the encryption tag 422 of FIG. 4B. Block 770 then checks to see if this is the first element to be processed for this key class. One way in which this determination can be made is to inspect the symmetric key value 523 of the preprocessing key class 520 in which the identifier 531 of the current key class is located (within field 522). If the symmetric key value 523 is null, then this key class has not yet been processed, and Block 770 has a positive result. Many alternative techniques may also be used, such as maintaining a lookup table of the key class identifiers for those key classes which have already been countered.

Blocks 775, 780, and 785 perform setup operations for each new key class being processed. Block 775 initializes the encryption process for this key class. This initialization begins by resolving the required encryption strength 521 from the respective preprocessing key class object 520 into a specific algorithm and key length (if this information was not directly specified in the policy object). Preferably this resolution is done by consulting an LDAP directory as taught by previously-referenced (Ser. No. 09/240,387), but the exact means of determining an algorithm and key length to provide a particular encryption strength is material to this invention. The resolved algorithm and key length are stored in the key class at 532 and 533, respectively. Next, a random symmetric key of the determined length is generated and inserted as the value of field 523 of preprocessing key class object 520. (Note that the post processing phase of the present invention does not expose this random symmetric key in clear text to other processes.) Furthermore, this random symmetric key 523 is then used to initialize (see Block 790) the first iteration of the cipher block chain for this key class, using techniques which are well known in the art. This process may also involve inserting a string of random bits, called an a on vector, before the first bit of the data to be enciphered.

Block 780 encrypts the generated symmetric key 523 separately for each community member (that is, for each distinct DN within the community) authorized to view the associated document element. This is performed by accessing each key object 500 (as stored in field 535, 536, . . . 539 of key class object 530) defined for the current preprocessing key class, and for each key object, (1) retrieving the public key 505 from the X.509 certificate 502a, (2) using this public key 505 to encrypt the symmetric key 523 using the encryption algorithm and key length stored at 532 and 533, respectively, and (3) storing the resulting encrypted key in field 503 of the key object. This will result in one encrypted copy of the symmetric key per community member having a separate DN 501 and X.509 certificate 502a. (In other words, when a community member is a group representing multiple individuals, then one encrypted copy of the plaintext symmetric key 523 is generated for the entire group and is associated with the group's DN.) To save space, the preferred embodiments then replace the X.509 certificate 502a with its corresponding KeyIdentifier 502b (such that format 500 is replaced with format 510), which in combination with the distinguished name 501 allows identification of the specific certificate which was used during encryption.

Block 785 then inserts the key class object 530 into the root of the DOM, as illustrated by the presence of key class objects 461, 462 in what may be considered the root area 460 of the output document 450 of FIG. 4C.

At Block 790, the element value read by Block 760 is encrypted using the plaintext symmetric key 523 (e.g. having a value similar to that shown for "tempkey" 434 in FIG. 4B), the encryption algorithm as identified by 532, and the key length 533 for the element's key class 531. If this is the first element being encrypted using a given key class, the initialization vector created in Block 775 will be used as input to the encryption algorithm; otherwise, material resulting from the previous CBC operation for this particular key class is used.

Note that it may happen that an element to be encrypted has other elements nested within it (i.e. as child elements) which also have a policy specifying encryption. To handle this situation, the post processor preferably scans the entire subtree it is about to encrypt, to determine if such nested elements exist. If so, the post processor then preferably determines the most restrictive type of encryption that applies to all elements of the subtree. The enclosing tags of the encrypted subtree represent the key class associated with this highest-level encryption strength, and any encryption tags that have been inserted around nested elements are removed. The entire subtree is then encrypted using this highest-level approach. Responsibility falls on the policy administrator who defines the security policies to ensure that this type of processing will not result in encrypting for the wrong community, or encrypting the subtree using the wrong algorithm. As will be obvious, the policy administrator must understand the semantics of the data to be processed in order to properly assign the element visibility.

While the selectively-encrypted document example shown in FIG. 4C depicts the element tags as having been left unencrypted, it may happen in a particular situation that it is desirable to encrypt the tags themselves as well as the data value(s) enclosed by the tags. To accommodate this possibility, the associated policy object may be written such that it places the encryption tags (see 422, 424 of FIG. 4B) surrounding the element tags rather than surrounding the element value.

It is possible that an element to be encrypted may be shorter than, or equal to, or longer than the block length used in the CBC process. If the data to be encrypted exceeds the block length, this step of the algorithm creates multiple blocks. If the data to be encrypted (plus the initialization vector) is not an even multiple of the block size, non-significant padding bits may be added at the end of the element, resulting in the last block for any given element containing zero or more padding bits. Normally a CBC has padding bits only at the end of the last block of data. However, in the present invention because each element is encrypted in a separate operation, padding bits may be present at the end of the last block for each encrypted element. Alternatively, well-known methods such as ciphertext stealing may be used to create a final ciphertext block that is shorter than the block length.

The encrypted element is then tagged to indicate that it has been encrypted (Block 795), using a syntax such as has been previously described (see 452, 454 of FIG. 4C) where the key class identifier 531 is included as an attribute of the tag for use in a subsequent decryption process. If the element contains padding bits, the number of padding bits may be indicated via an attribute on the encrypted element, or by preceding the plaintext data with a length field prior to encryption. (Note that this particular key class is necessarily one of the key classes such as 461, 462 in the document's DOM root, having been inserted therein by Block 785.) The key class information from the DOM root is required for the decryption process. Further note that when the document (such as document 450 of FIG. 4C) being generated is an XML document, the new objects and their associated tags (such as the key classes 461, 462, the encrypted data tags 452, 454, etc.) which will be transmitted in this document according to the present invention appear as elements of the data policy name space (e.g. by using "encrypt:class" rather than simply "class" for key class objects 461, 462) in order to prevent ambiguous interpretation or unintended processing of these objects and tags.

Block 798 then checks to see if the end of the DOM stream has been reached. If so, then the selective encryption process is complete, and the output document 450 is ready for secure storing or secure transmission, and FIG. 7C ends. Otherwise, control returns to Block 760 to read the next element from the DOM stream.

A number of different preferred embodiments are defined herein for decrypting the selectively-encrypted document created by the processing of FIGS. 7A through 7C. As has been stated, each decryption process preferably operates as part of an augmented XML processor. Each preferred decryption embodiment will now be described in turn.

First Preferred Embodiment for Decryption

In one preferred embodiment, an individual user (equivalently, a single application program or process having its own DN) receives the encrypted document on his client workstation, and executes a decryption process on that workstation. The logic with which this preferred embodiment may be implemented in depicted in FIGS. 8A and 8B. (This preferred embodiment ignores the case where a user may be an authorized community member by virtue of being a member of a group, where that group is defined as a community member. The logic used to process a user as a group member is discussed below, with reference to FIGS. 10A–10C. Although this embodiment discusses the processing of document receipt for an individual who is not a group member as being separate from the logic from used to process a group member, it will be obvious to one of skill in the art that the logic for these cases can be combined in a particular implementation. In particular, logic—such as that described below beginning at Block 1006—may be inserted following a negative result in Block 825, also discussed below, to determine whether the user is a group member.)

At Block 800, the user has received a document (such as the document represented at 450 of FIG. 4C) which has been selectively encrypted. This document may have been received in response to a request by this user. Or, it may have been forwarded to this user by another user or process, as part of a group collaboration effort. Provided that this user's public key was used to encrypt at least one of the encrypted elements of the document, the user will be able to access that security-sensitive information, regardless of whether the document was originally created for this user. Block 805 reads a key class object (such as key class object 461 or 462) from the DOM root of the received document (where the augmented XML processor has created a DOM tree representation of the received document). If no such key classes exist, then this received document has not been selectively encrypted using the present invention, and the document may be rendered using processes outside the scope of the present invention. Block 810 checks to see if this user's DN appears in one of the key objects for this key class. In the employee record example, assuming an employee's DN uses his serial number for the value of the CN field, the employee named John Q. Smith and having serial number E 135246 (see 402, 404 of FIG. 4A) would locate his DN at key object 465, and thus Block 810 would have a positive result.

When Block 810 has a positive result, processing continues at Block 815 where the encrypted symmetric key is retrieved from this key object which has a DN matching the user's DN. (Referring to FIG. 5A, the encrypted key 503 is being retrieved from an object having the format depicted at 510.) The user's private key is then used to decrypt this encrypted symmetric key at Block 820. Recall that the user's public key was used to encrypt this key at Block 790 of FIG. 7C, and thus if this user is the proper holder of the public and private key pair, the decryption process will succeed; otherwise, if the user does not hold the private key corresponding to the public key used at Block 790, then this user will be prevented from accessing the security-sensitive elements within the key class being processed.

Block 825 is reached following completion of Block 820, and following a negative result at Block 810. Block 825 checks to see if there are any more key class objects in the DOM root of the received document. The user may be authorized for decrypting more than one key class, as in the case of the employee in the employee record example where the employee is to have access to all encrypted information (and will thus be set up as an authorized community member for every key class used to encrypt the document). If Block 825 has a positive result, then control returns to Block 805 to process the next key class object; otherwise, all keys for which this user is authorized have been recovered, and the encrypted document will now be processed.

Block 830 reads an element of the DOM, proceeding in the same stream order as was used in the encryption process in order to reverse (i.e. decrypt) the cipher block chaining operations. Block 835 asks whether the element just read is encrypted, as determined by the presence of an encryption tag such as the tag in 452 of FIG. 4C. If not, then Block 840 adds the plaintext element to an output buffer being created. Block 845 checks to see if the end of the DOM stream has been reached. If not, control returns to Block 830 to process the next document element. If, on the other hand, Block 845 has a positive result (i.e. the document has been completely processed including decryption of those encrypted elements for which the user possessed the required private key), the contents of the output buffer are used to render the document elements from the output buffer (Block 850) using techniques which are known in the art. The processing of FIG. 8A then ends.

Returning to Block 835, if this test has a positive result (i.e. the element is encrypted), then an attempt will be made to decrypt the element value using the logic shown in FIG. 8B. First, the key class identifier is retrieved from the key class attribute (Block 855). Then, Block 860 checks to see whether this user recovered a symmetric key for that retrieved key class. If so, then Block 865 asks whether this is the first element decrypted in this key class. If this test has a positive result, Block 870 indicates that the initialization vector that was inserted according to the CBC of the prior art is discarded. If this test has a negative result, then the results of the previous decryption for that key class are used to initialize the decryption algorithm. Block 875 then uses the key which was decrypted at Block 820 for that key class, along with the cipher block chaining input, to decrypt the encrypted element. Processing returns to Block 840 of FIG. 8A, where the decrypted value is appended to the output buffer. If the user did not recover a key for this key class, however, then Block 880 indicates that a substitute value may be used, such as "Element cannot be decrypted". Control returns to Block 840 of FIG. 8A, where this substitute value is appended to the output buffer.

This approach of supplying substitute text (see Block 880) is used in the preferred embodiments rather than returning garbled information to be rendered to the user, or passing unintelligible (i.e. still encrypted) data to an application program. Other techniques for providing substitute text may also be used. For example, the encryption strength (e.g. "Classified", "Top Secret", etc.) associated with the element may be indicated in place of the value which could not be deciphered. Or, an indication could be provided visually to indicate that the element was "censored" using an appropriate visual indication, or the encrypted value might simply be passed through for possible decryption by another processing entity. Alternatively, it may be desirable in a particular implementation to simply omit all reference to the element from the output document. However, use of this substitution approach or any particular representation thereof is an optional feature of the present invention, and may be omitted without deviating from the scope of the present invention.

Second Preferred Embodiment for Decryption

Another preferred embodiment is defined for the situation where either (1) a user's workstation has insufficient processing power to perform the decryption process of the present invention, or (2) it is desired to avoid program code changes on the client workstation. Thus, a client proxy performs the decryption process on behalf of the user (or on behalf of an application executing on the user's workstation). The logic with which this preferred embodiment may be implemented is depicted in FIGS. 9A and 9B. The user in this scenario uses a standard Web browser client application (such as browser client 675 of FIG. 6) executing on his workstation or a standard program client (such as program client 680), and requests a selectively-encrypted XML document from a proxy (such as client proxy 655) acting on behalf of the browser client. Through use of this client proxy 655, this preferred embodiment enables serving selectively-encrypted document content to browser clients 675 or program clients 680 without requiring any program changes or additional software operating on the client device.

FIG. 9A depicts the preferred embodiment of an initialization process performed by client proxy 655 (referred to equivalently as a server) to enable the proxy 655 to access selectively-encrypted documents on behalf of a standard browser client 675 or a program client 680; FIG. 9B then illustrates the preferred embodiment of the logic with which this proxy decrypts the content (if authorized to do so) and serves the decrypted content over a secure session (such as an SSL session) to that client. The description of FIGS. 9A and 9B will be in terms of the proxy 655 acting on behalf of the browser client 675; however, it will be apparent to one skilled in the art that this logic applies also to a program client 680. (The processing within the client is not depicted for this embodiment, as the client processing uses techniques which are known in the art: the novel functions whereby a selectively-encrypted document is served according to the present invention operate on the client proxy in this embodiment.)

First the user of browser 675 tries to access a specific Web page. The server 655, upon receiving this request at Block 900, ascertains browser 675's capabilities (e.g. by inspecting the request header fields, as is known in the art). At Block 902, if the browser 675 is capable of an appropriate level of encryption, an encrypted connection with mutual authentication (referred to in FIGS. 9A and 9B as an SSL session for ease of reference, although alternative protocols such as TLS may also be used) is established between the browser client and proxy. (The purpose of establishing a secure session between the browser and proxy is to enable the proxy to perform decryption of security-sensitive information on behalf of the client, and then to return that decrypted information to the client using the secure session, thereby protecting the decrypted information from exposure to other parties.) Otherwise, a connection without SSL is established.

Block 904 tests whether a mutually-authenticated SSL session with encryption was established. If it was, processing continues at Block 906; otherwise, processing continues at Block 922. At Block 906, the proxy 655 examines the client's certificate (which was passed during the SSL session establishment, according to the prior art). A number of tests may be performed on this client certificate using techniques which are known in the art, such as: determining if it has expired; determining whether the chain of trust back to the root authority can be validated; etc. If the certificate is OK, at Block 908 server 655 searches the LDAP directory 640 (or other repository) for the client's certificate to obtain the associated DN. If the tests performed at Block 906 indicate problems with the client's certificate (e.g. the certificate is expired), control may optionally transfer to Block 920 to attempt to fix the certificate problem, as will be described below. (Alternatively, the server 655 may simply reject the client's request such as by returning an error message when Block 906 has a negative result, after which the processing of FIGS. 9A ends. FIG. 9B will not be invoked in this situation, as the client proxy is not able to serve a secure document to this requesting user.)

Block 910 checks to see if the corresponding DN was found. If so, the server 655 may optionally perform the processing at Blocks 912 and 914. This optional processing comprises first testing at Block 912 to see if the certificate will expire soon ("soon" as may be defined by a systems administrator or installation policy, which information is accessible to server 655, e.g., as policy information stored in a database or in an LDAP directory 640). If the certificate is expiring soon, this optional processing continues at Block 914 where (assuming the user's certificate was issued by a local certificate authority, and a reauthorization request for this soon-to-expire certificate has not already been issued) the server 655 queues a reauthorization request (see 1270 of FIG. 12) to the administrator application 630 but continues processing on behalf of the client 675. Finally, when either the optional processing of Blocks 912 and 914 has completed or when this processing has been omitted, the server 655 saves (Block 916) the user's DN with the SSL session context for future reference (see the description of Block 974, below). Block 917 then checks to see if a URL for a selectively-encrypted document is already available, e.g. from the client's request in Block 900. If so, then control transfers to Block 942 of FIG. 9B; otherwise, the server 655 preferably builds a custom "https" Web page (i.e. a secure hypertext transport protocol Web page to be transmitted over the secure session) for the user 675 at Block 918, such as a menu showing secure documents that user 675 may request. Alternatively, the server 655 may simply present a query menu such as a database front end to the user in Block 918, allowing the user to search for particular selectively-encrypted documents which are available. After the processing of Block 918 completes, control transfers to Block 940 of FIG. 9B to serve a selectively-encrypted page to the requesting user.

Returning now to the discussion of Block 904, if an SSL session was not established (e.g. the client 675 did not have a certificate), an optional procedure may be performed whereby the server 655 attempts to gather information for creating a client certificate. This optional procedure comprises Blocks 922 through 932, and begins with the server displaying a registration form (Block 922) to solicit the entry of necessary identification data from the user. The user enters the requested information at Block 924 (for example, name, organization, telephone number, e-mail address, employee number, credit card number), which can later be independently verified by the administrator 630 in the process that is described below with reference to FIG. 12. (It will be understood that the specific registration identification data to be collected and validated will differ according to the needs of a particular installation. Such organizational policies may be established and enforced through the use of an LDAP directory 640.) The server 655 then assigns user 675 a distinguished name and certificate (Block 926). Note that at this time, the new certificate is not yet associated with any access privileges. It simply enables the user 675 to be uniquely identified as associated with the assigned DN on subsequent visits, by proving his relationship to the certificate associated with his DN using a digital signature. At Block 928, the server 655 stores (e.g. in the LDAP directory 640) the user's data entry (from Block 924), DN, and certificate for future reference.

At Block 930, the server 655 creates a "new user approval request" (see 1290 of FIG. 12) using the registration information which has been obtained, and places this request into the administrator's work queue (see 1200 of FIG. 12) for later processing. Finally, at the completion of this optional processing, a default secure Web page may be displayed (Block 932) to the new user, where this default page may display a message such as "Welcome to the secure document server system. You will be contacted by e-mail when your access privileges have been granted." The processing of FIG. 9A (and also FIG. 9B, as the client proxy cannot yet decrypt a secure document on behalf of this user) is then complete.

Returning now to the discussion of Block 906, if a secure session was established, but problems were found with the client's certificate, then a further optional feature of this preferred embodiment may be performed by transferring control to Block 920 from Block 906. Block 920 checks to see if any previous registration data exists for this client (e.g. in LDAP directory 640). If not, then the optional processing previously described for Blocks 922 through 932 may be performed (or, processing may simply end). If previously-existing data is found, then according to this optional feature the server 655 may proceed by creating a reauthorization request that will use this existing information, and control transfers to Block 930 (discussed above) to queue this request for processing.

The optional feature just described with reference to Block 920 may also (optionally) be invoked from Block 910, when the search for the client's DN does not complete successfully. When Block 910 has a negative result, it is known that the client had a valid certificate (a "Yes" result at Block 906), but that no DN matching this certificate was found in the LDAP directory 640 or other repository which was searched at Block 908.

It is well known in the art that proliferation of digital certificates is becoming a problem, causing confusion among users and eventually leading to scalability problems due to the number of certificates required to be stored, accessed, renewed, etc. for each client. Thus, the optional processing of Block 920 which attempts to locate and use previously-existing registration information may be provided in an implementation of this preferred embodiment with the goal of enabling a user with an existing valid certificate (or one that may have expired, and merely needs to be renewed, as is the case when this processing is invoked in response to a negative result at Block 906) to be added to this secure document system without necessarily issuing the user a new certificate. Therefore, when this optional processing locates existing registration information (a "Yes" result at Block 920), this existing information is used to prepare a work request for the administrator (as described above with reference to Block 930), requesting the creation of a new entity (see 1290 of FIG. 12).

FIG. 9B depicts the processing with which the client proxy 655 decrypts and serves a selectively-encrypted document to a client 675, after the processing of FIG. 9A has been performed. The user 675 chooses a selectively-encrypted document at Block 940 (e.g. such as from the menu displayed in Block 918). The server then retrieves this requested document (Block 942). (Note that control also reaches Block 942 following a positive result at Block 917 of FIG. 9A.) The augmented XML preparser 660 operating on the server 655 now reads the DOM representation of the document (Block 944) in stream order (to align with the order in which the document was parsed during encryption) for an element encrypted according to the present invention. If the element located at Block 944 is not encrypted (a "No" result at Block 946), the server proceeds to Block 966, where the plaintext data is appended to an output buffer. Otherwise, when the element is encrypted (a "Yes" result at Block 946), the proxy 665 will attempt to decrypt this element on behalf of the client 675.

The process of decrypting an element on behalf of the client 675 begins at Block 948, where the proxy 665 expands the groups membership of those DNs which represent groups in the key class of this element. Referring to the example document in FIG. 4C, the processing of Block 948 comprises locating the key class identifier 456 when processing encrypted element 452, then finding the DNs of groups 471, 473 from the key objects within the key class 461 having the identifier 456 (sec 463) which is located on the encrypted element tag, and then determining the membership of these groups having common names "managers" 470 and "hr" 472. When an LDAP directory is used for storing group membership information, as has been described, determining the membership comprises issuing an LDAP command for each DN assigned to a group, where that command retrieves the DNs of the individual members of the group. (As will be obvious, when a data repository other than a directory is used for storing group membership information, the retrieval command appropriate to that repository is used.) Alternatively, a query can be performed in the form of "Is this (individual DN) a member of this (group DN)?".

After expanding the groups in this key class, Block 950 asks whether the user on whose behalf the proxy is operating is a member of any of these groups. If not, control transfers to Block 964 where a message is preferably generated (rather than using the still-encrypted element, as discussed above with reference to Block 880) and appended (Block 966) to an output buffer, indicating that the element could not be decrypted. When the user is a member of at least one authorized group, processing continues at Block 960.

Block 960 locates the clerk for the group (or, if the user is a member of multiple groups authorized for this key class, the clerk of any such group), where the clerk is the holder of the private key for the group. When using an LDAP directory, this comprises querying the LDAP directory using the group DN for the group identified in the key object, requesting the DN for the group's clerk. If the group clerk is found (Block 962), then control transfers to Block 972; otherwise, the absence of a group clerk dictates that the element cannot be decrypted on behalf of the group member, and a substitute element to this effect is appended to the output buffer in Blocks 964 and 966.

At Block 972, the proxy preferably establishes a secure SSL (or other mutually-authenticated protocol) session to the group clerk. Block 974 then requests the clerk to decrypt the encrypted symmetric key from the key object establishing this user as an authorized community member. This request to the clerk comprises passing the key object containing the encrypted symmetric key, the proxy server's certificate, and the DN of the user. (Note that the proxy should be contacted only once for a particular key class for which a symmetric key is needed during decryption of a document.) Preferably, this information will be digitally signed before passing it from the proxy to the clerk, such as by signing a message digest with the user's private key corresponding to the user's X.509 certificate. Signing can prevent a man-in-the-middle attack or a replay attack. (Various signing methods known in the art may be used without departing from the scope of the present invention.) When a mutually-authenticated secure session (such as an SSL or TLS session) is being used between the proxy and clerk, digitally signing the transmitted information is not strictly necessary, as the encrypted session provides equivalent data integrity. In one aspect of this preferred embodiment (further discussed with reference to Block 982, below), the element to be decrypted is also part of the signed information passed to the clerk. (Recall that the user's DN was saved during the processing of Block 916.) Referring to the document 450 in FIG. 4C, suppose the user has been determined to be a member of the "managers" group 470, 471. In that case, the key object 464 is passed by Block 974 to the clerk for the managers group, requesting the clerk to decrypt key 475.

Block 976 represents processing by the group clerk, where the clerk checks to see if the user and proxy server are both members of the authorized group. (Note that the proxy server should be an authorized group member, as it will have access to the decrypted security-sensitive information if the decryption process completes successfully. Furthermore, the proxy may be specified as a group member of a community, using a syntax similar to 470, 471 of FIG. 4C where the "managers" value 470 is replaced by a value such as "proxy" or "proxies". If the clerk detects during Block 976 that this group syntax has been used to specify the proxy, then the proxy group must be expanded—as described above for Block 948—to verify that the proxy is indeed an authorized community member.) When the information passed to the clerk has been digitally signed (during the processing of Block 974), the verification process performed in Block 976 by the clerk preferably also comprises verifying the digital signature (using techniques which are well known in the art) to ensure that the requester is the true source of the request, and that the information has not been altered since its signing—although this verification may be omitted if the information was received on a mutually-authenticated secure session. If Block 976 returns a negative result, an error code or other failure indicator is returned to the proxy by the clerk, indicating that the clerk will not decrypt an element for this proxy on behalf of this user. Control then transfers to Block 964, where a suitable text message is placed into the output buffer.

If the test in Block 976 succeeds, the clerk then decrypts (Block 978) the symmetric key from the key object passed to it in Block 974. The clerk maintains a private key for each group on whose behalf it performs a clerk function. Thus, the private key for the group identified in the key object is used for this decryption process. Block 980 checks to see if this decryption was successful. If not, error handling (as described for a "No" result in Block 976) is performed. When the decryption succeeds, the clerk has recovered the symmetric key used to encrypt all document elements referencing this particular key object (i.e. the document elements authorized for this group within this particular key class), and processing continues to Block 982.

In a first aspect of this preferred embodiment (where the element located in Block 944 has not been passed to the clerk in Block 974), after the clerk decrypts the encrypted symmetric key (Block 978, above) using the group's private key, the clerk then re-encrypts the now-plaintext key using the public key of the proxy (which can be obtained from the proxy certificate passed in Block 974). This new version of the symmetric key is then digitally signed by the clerk using the clerk's private key, and returned to the proxy (not shown). Upon receiving this re-encrypted signed key, the proxy verifies the clerk's digital signature, to ensure that the transmission was not sent from an imposter clerk and has not been altered. The proxy then uses its own private key to decrypt this re-encrypted key. At Block 982, this decrypted key is then used by the proxy to decrypt the element located by Block 944, and this element is then appended to the output buffer (Block 966). In this aspect, security of the sensitive information is further protected by having only one process (i.e. the proxy) accessing the encrypted element value on the user's behalf rather than two (i.e. the proxy and the clerk, as will be described below for an alternative aspect). Optionally, the clerk may also return the proxy's certificate (or the corresponding key identifier) when the newly-reencrypted key is being returned, so that the proxy can easily locate the corresponding private key on its local key ring or key chain (given that the proxy may have multiple certificates, and multiple private keys).

Note that in this first aspect, because the clerk encrypts the sensitive information (the newly-encrypted symmetric key to be used for decrypting the document element) it returns to the proxy, it is not strictly necessary to have a mutually-authenticated secure session between the proxy and clerk. If, on the other hand, a mutually-authenticated secure session does exist between these parties, then the clerk may simply return the key decrypted in Block 978 to the proxy over this secure session, rather than re-encrypting the key and returning this re-encrypted version.

In an alternative aspect of this preferred embodiment, the element to be decrypted has been passed to the clerk during the operation of Block 974. The clerk uses the symmetric key which it decrypted at Block 978 to decrypt this document element at Block 982. The decrypted element may then be returned (not shown) from the clerk to the proxy unencrypted, provided that a mutually-authenticated secure session exists between them. (Otherwise, similar to the technique described above for the first aspect of this embodiment, if a mutually-authenticated secure session is not available, then the clerk must re-encrypt the decrypted document element with the proxy's public key, and sign the result with the clerk's private key, before returning the element to the proxy over the non-secure session. Upon receiving this re-encrypted element, the proxy verifies the clerk's digital signature, to ensure that the transmission was not sent from an imposter clerk and has not been altered, and then uses its own private key to decrypt the re-encrypted element.) The returned element is then appended to the output buffer (Block 966) by the proxy. This type of optimized embodiment might be suitable for an implementation in which both the clerk and proxy functions reside on the same computer.

After Block 966 has appended an element to the output buffer (whether it is a decrypted element, a plaintext version of an element that did not need decrypting, or an error message indicating an element could not be decrypted), Block 968 checks to see if the document being processed contains any more elements. If so, control returns to Block 944 to, retrieve the next of these elements. Otherwise, Block 970 passes the now-complete output buffer representing the document contents back to the requesting user on the secure session, for local rendering on the user's device or by the program client, and the processing of FIG. 9B ends. (Alternatively, control may return to Block 940 following completion of Block 970, to await another selection by this user.)

It should be understood that the proxy 655 may also convert the decrypted document into one or more other tagged formats as appropriate for a particular client, such as HTML, Wireless Markup Language ("WML"), Standard Generalized Markup Language ("SGML"), or even the internal file format used by a word processor or printer before returning the document content at Block 970.

Third Preferred Embodiment for Decryption

In yet another preferred embodiment, the encrypted document is requested and received by a member of a group, where the group may be an authorized member of a community which has access to at least one element of the selectively-encrypted document. The group member then uses a clerk process to decrypt the symmetric key so the group member can decrypt certain fields of the document. The logic with which this preferred embodiment may be implemented is depicted in FIGS. 10A through 10C.

The processing of FIG. 10A begins with a group member requesting a selectively-encrypted document from a document server at Block 1000 (for example, by selecting a document identifier from a menu, by issuing a database query which results in selection and retrieval of the document, etc.) Block 1002 indicates that the group member (referred to equivalently as the "user" for the remainder of the description of FIGS. 10A–10C) receives the requested document. The decryption process then begins. (Note that while the processing of document receipt for a group member and for an individual who is not a group member has been shown as separate logic in FIGS. 10A–10C and FIGS. 8A and 8B, respectively, it will be obvious to one of skill in the art that the logic for these cases can be combined in a particular implementation. Similarly, the logic for using a client proxy to decrypt a document on behalf of a user, as depicted in FIGS. 9A and 9B, may be combined with either or both of these other approaches. Furthermore, the key recovery technique to be described below with reference to FIG. 11 may be combined with any combination of the other functions.)

Block 1004 reads a key class (such as 461, 462 of FIG. 4C) from the root of the DOM representation of the retrieved document. Any DNs in this key class which represent groups are expanded (e.g. by issuing LDAP queries to retrieve the DNs of the group members, or other equivalent technique when a different storage repository is used) at Block 1006. Block 1008 checks to see if this user is a member of any of the expanded groups. (Alternatively, the user may consult locally-stored information to determine if he believes himself to be a member of any of the groups. Such locally-stored information can result from the notification that will be described in reference to Blocks 1240 and 1287.) If so, then the key class object is preferably added to a list of key class objects in Block 1010, where the list of all key classes needing decryption is created for subsequent processing according to the logic of Blocks 1014 through 1022, as will be described. This approach reduces the number of secure session establishments and network roundtrips if a given clerk is responsible for more than one group. Alternatively, the logic of Blocks 1014 through 1022 may be invoked immediately upon encountering a positive result in Block 1008, with the possibility of contacting a particular clerk more than one time. (If a particular user is a member of more than one group for any given key class, an implementation-specific decision may be made as to which group to process, i.e. which clerk to contact, and as to whether a failure to locate the clerk and successfully decrypt the key objects for that selected group should be followed by attempting the process for any subsequent groups or alternate clerks for the same group, if any exist.)

Control reaches Block 1012 when the user is not a member of any expanded groups (a "No" result at Block 1008), and also after the processing of Block 1010. Block 1012 checks to see if there are any more key classes in the DOM root. If so, control returns to Block 1004 to process the next key class; otherwise, processing continues at Block 1014.

The processing depicted in Blocks 1014 through 1024 is repeated for each different clerk responsible for the key classes accumulated by Block 1010. Block 1014 locates the clerk responsible for a group. A group clerk must be contacted to decrypt the group's encrypted symmetric key (such as key 475 of FIG. 4C), as users who are group members do not have local access to the group's private key; instead, the group clerk maintains this private key. Preferably, the group clerk is located by accessing the information for the group in the LDAP directory (or other repository), where this information includes the identification of the clerk. Block 1016 asks whether the group clerk was found. If not, then the remaining logic of FIG. 10A is bypassed for this group (or groups, if multiple groups use the same clerk), and processing continues at Block 1028 of FIG. 10B. (Any encrypted elements in key classes for which this logic bypassing occurs will not be able to be decrypted, as will be discussed with reference to FIG. 10B.)

After locating a group clerk successfully, Block 1018 preferably establishes an SSL or other mutually-authenticated secure session between the user and the clerk. Preferably, the user then digitally signs each key class object that will be transmitted to the clerk (Block 1020). (As previously described with reference to Block 974 of FIG. 9B, it is not strictly necessary to digitally sign the key class objects if they are to be transmitted on a mutually-authenticated secure session.) The key class objects and the user's corresponding signing certificate (or its corresponding key identifier) are then passed to the clerk (Block 1022). (Note that if a mutually-authenticated secure session was not established, then the certificate of the user must be passed to the clerk; otherwise, the key identifier can be passed instead.) The processing which occurs at the group clerk in response to receiving this information is shown in FIG. 10C, and will now be discussed.

At Block 1060 of FIG. 10C, the clerk process has received one or more key class objects which need to be decrypted for the user, along with the user's certificate (or equivalently, the user's DN and key identifier). Each key class object is processed according to the logic of Blocks 1060 through 1070, after which the clerk is finished and awaits another such request. Block 1060 gets a key class object from the passed information. If the objects have been digitally signed, the clerk preferably verifies this digital signature. (As previously described with reference to Block 976 of FIG. 9B, the creation of digital signatures and verification thereof may be omitted if information is being transmitted on a mutually-authenticated secure session.) At Block 1062, the clerk checks to make sure that the requester is an authorized member of the group whose DN appears in the key class object, by querying the directory or other repository to determine the group members. If the requester is not an authorized group member, control transfers to Block 1068 without further processing of this key class object. Otherwise, when Block 1062 has a positive result, the clerk decrypts the group's encrypted symmetric key from the key class object using the clerk's local copy of the group's private key. (Recall that the group's public key was used to encrypt this field, according to Block 780 of FIG. 7C.) The clerk then re-encrypts the result (Block 1066), using the public key of the requester as determined from the certificate which has been passed with the decryption request. (Alternatively, if a DN and key identifier were passed with the decryption request instead of a certificate, the clerk will use the DN to obtain a list of certificates corresponding to this DN from an LDAP directory or other repository. The clerk will then select a particular certificate from the returned certificates using the passed key identifier, and the public key from this particular certificate will be used in Block 1066.) The clerk may alternatively omit the re-encryption of the result in Block 1066, provided that a mutually-authenticated secure session was established during Block 1018.

If there are more key class objects in this request (Block 1068), the next key class is processed by returning control to Block 1060; otherwise, the key class object(s) and re-encrypted symmetric key(s) (or, depending on the alternative processing just described, one or more plaintext keys and/or plaintext document elements, or re-encrypted document elements) are digitally signed by the clerk (if the session between the requester and clerk is not a mutually-authenticated secure session), and returned to the requester (Block 1070), after which the processing of FIG. 10C ends.

Returning now to FIG. 10A, Block 1024 resumes the user's processing, after the clerk processing of FIG. 10C has completed, by receiving the key objects (i.e. within key class objects) which were passed. Optionally, the certificate which was passed (or its key identifier) may also be returned so that the requester can easily locate the corresponding private key on its local key ring or chain (given that a requester may have more than one certificate and private key). If the returned information was digitally signed by the clerk, the user first verifies the digital signature to ensure that the information was not created by an impostor and has not been altered. (If the session between the user and clerk is a mutually-authenticated secure session, then the signing by the clerk, and verification by the user, is not required.) The user then decrypts the symmetric key from each key class object returned from a group clerk (Block 1026) using the user's private key. (Or, if the keys are returned unencrypted on a mutually-authenticated secure session, this decryption in Block 1026 is not required: these unencrypted keys will be used directly for decrypting elements of the associated key classes.) The user will now be able to decrypt the elements for that key class, as will now be described with reference to FIG. 10B.

The elements of the DOM are read in stream order (Block 1028), to match the order in which they were read and processed during encryption. Block 1030 asks if the element just located is encrypted. If not, control transfers to Block 1038 where the unencrypted element is appended to an output buffer being created. Otherwise, when the element is encrypted, Block 1032 checks to see if a decrypted symmetric key exists for the key class associated with this element. If there is no such decrypted symmetric key (e.g. the user was not a member of any authorized groups for this element, or the group clerk could not be located, etc.), then this user is not authorized to view the encrypted element, and a suitable message is substituted for the encrypted element at Block 1034. When the symmetric key for this key class was successfully decrypted, Block 1032 has a positive result and Block 1036 uses that decrypted key to decrypt the element. Block 1038 then appends the result to the output buffer. If there are still more elements to be processed (a "Yes" result at Block 1040), processing returns to Block 1028; otherwise, the output buffer is complete and its contents are rendered for the user at Block 1042. The processing of the encrypted document is now finished, and FIG. 10B ends.

Fourth Preferred Embodiment for Decryption

It may become necessary to recover the entire contents of a document (for example, when an encrypted document stored in a company repository becomes the subject of litigation) without regard to how the document was broken down into different key classes during the encryption process. Another preferred embodiment of the present invention defines a technique whereby an authorized user (such as a systems administrator, escrow agent, etc.) may recover all the keys which were used to encrypt such a document. The logic with which this key recovery technique may be performed is shown in FIGS. 11A and 11B.

According to this preferred embodiment, the party which is to have authority for recovering all keys (hereinafter referred to as the "key recovery agent") is defined as an authorized community member for each key class of each document. This will cause a key object for the key recovery agent to be included in the document for each key class, where the key object includes a symmetric key which has been encrypted with the key recovery agent's public key. Thus, the key recovery agent's private key can be used to decrypt the symmetric key if that becomes necessary, providing access to the encrypted elements of the key class.

Note that this key recovery technique is also beneficial for other situations, for example: the private key that would otherwise be used to decrypt a document element becomes lost; a user holding a private key leaves the company without providing the private key value; a user holding a private key as a group member is reassigned, and is no longer a group member; etc.

FIG. 11A depicts additional logic that may be inserted into the logic flow of FIG. 7A, above, for the encryption process. (Note that this additional logic is not strictly required if it can be determined conclusively that the key recovery agent was included in the community for each stored policy object. Use of this additional logic, however, provides a technique to ensure that the key recovery agent will have access to the elements in every key class.)

The logic of FIG. 11A modifies the flow of control from Block 725 of FIG. 7A to Block 730 of FIG. 7A, and thus these substitute blocks are represented in FIG. 11A as Blocks 725' through 730', respectively. Following operation of Block 725', Block 726 asks whether the key recovery agent is a member of the retrieved community. If not, then Block 727 adds the DN (or other similar identifier, when using a storage repository other than an LDAP directory) for the key recovery agent. Thus, when the encrypted symmetric keys are later created (see Block 780 of FIG. 7C), the key recovery agent's public key will be used in a key object having the agent's DN, and the agent will subsequently be able to decrypt this symmetric key (and its associated elements) using its private key.

FIG. 11B shows how the logic flow of FIG. 8B may optionally be modified to account for the key recovery agent. Blocks 855', 865', 870', and 875' of FIG. 1B represent the same functionality as Blocks 855, 865, 870, and 875 of FIG. 8B. (Refer to the discussion of FIG. 8B, above, for a detailed description of this processing.) However, because the key recovery agent will always be an authorized community member, the existing test at Block 860 of FIG. 8B will always have a positive result, and thus this test and Block 880 (which handles the negative result) may be omitted. As will be obvious, the modification shown in FIG. 11B should only be made if the implementation is tailored specifically to the key recovery agent.

Administration

FIG. 12 depicts the preferred embodiment of the logic with which an administrator or administration process sets up and administers the secure document system of the present invention. This logic begins at work request queue

1200 where one of processes 1210, 1220, 1250, 1270, or 1290 is dispatched according to the type of work request.

In Block 1210 the administrator 630 creates a new group by 1215 putting an entry for the group into the LDAP directory 640. Block 1219 indicates that no further processing is required for this type of work request. Note that after a group has been created, it is non-functional until at least one clerk entity and at least one member entity are associated with the group. A group can have more than one clerk. It can have zero or more authorized agents (proxies).

In Block 1220 the administrator 630 adds an entity to a group. In Block 1225 a test is made to see if the group already exists in the LDAP directory 640 as a result of prior group creation 1210. If not, this is an error (Block 1245). In Block 1230 a test is made to see if the entity to be added already exists in the LDAP directory 640 (as a result of prior entity creation 1290). If not, this is also an error (Block 1245). Passing both tests 1225 and 1230, the entity is added to the group in Block 1235. Then optionally the entity is notified (Block 1240). For example, this might be an e-mail notice telling the user 675 to logon to the secure document system because secure documents may now be accessed. Block 1249 indicates that no further processing is required for this type of work request. Such notification may also enable an optimized implementation in which a group member decides locally that it should attempt to contact a clerk, without first retrieving a possibly-very-long list of all group members from an LDAP directory to determine its own group membership.

In Block 1250 the administrator 630 removes an entity from a group. In Block 1255 a test is made to see if the group already exists in the LDAP directory 640. If not, this is an error (Block 1245). In Block 1260 a test is made to see if the entity to be removed already exists in the LDAP directory 640. If not, this is also an error (Block 1245). Passing both tests 1255 and 1260, the entity is removed from the group (Block 1265). If the entity is a member of more than one group and the entity is to be completely removed from all such groups, then Block 1265 is repeated for each such group. If the entity's certificate was not one created according to Block 1280, then the certificate revocation list (Block 1267) is updated, for example by making an entry in the LDAP directory and/or contacting the certificate authority 635. Block 1269 indicates that no further processing is required for this type of work request.

In Block 1270 the administrator 630 reauthorizes an entity that is currently a member of a group, such as after receiving a reauthorization request (see Block 914 of FIG. 9A). In Block 1275 a test is made to see if the entity's access privileges or certificate have been revoked. If so, the process proceeds to Block 1278 whereupon a revoke entity work request (Block 1250) is processed via entry point 1205. If not, in Block 1277 the administrator 630 examines the registration data provided by the user 675 (in Block 924 of FIG. 9A). If the data is satisfactory, the administrator 630 issues an updated certificate with a new expiration date (Block 1280), updates the directory (Block 1285), and optionally notifies the entity (Block 1287). Block 1289 indicates that no further processing is required for this type of work request. If the registration data (a "No" result in Block 1277) is not OK, the process proceeds to Block 1278 whereupon a revoke entity work request (Block 1250) is processed.

In Block 1290 the administrator 630 processes a request to create a new entity 655, 670, 675, or 680. First the administrator 630 examines the registration data (from Block 924 of FIG. 9A) at Block 1292. At Block 1294 if the data is satisfactory, the administrator 630 issues a new certificate, if needed, in a manner similar to Blocks 1280–1287, otherwise uses the entity's existing certificate, determines (Block 1298) what group(s) the entity should be added to, processes these group additions such as by creating multiple work requests (Block 1300) and queuing these as input to Block 1200, and then branching to Block 1202 multiple times to process these queued requests. Block 1309 indicates that no further processing is required for this type of work request.

Thus, at the conclusion of the administration processing in Block 1220–1249 and their necessary antecedents, a client 675 is able to perform the logic of Blocks 902–918 of FIG. 9A (establishing an SSL session to the secure document server 655), and perform the logic of FIG. 9B to select an encrypted document, get it decrypted, and securely view the elements of the document for which the user 675 is authorized.

As has been demonstrated, the preferred embodiment of the present invention provides an easy-to-use, flexible approach for enforcing security policy. The security policy information may be different from one data element to another, and is specified by binding the data policy identifier (i.e. the URI where the policy is stored) to the data element in the document DTD. The present invention is backward compatible, permitting XML documents to be used by both XSL processors which have been modified to utilize policy instrumentation according to the present invention, as well as by XSL processors which have not been so modified. (Such unmodified XSL processors simply perform the entity substitution of the data policy URIs within the DTD, but do not retrieve nor process the policy objects referred to by those URIs.)

A further advantage of the present invention is that no change is required in the style sheet that controls the transformation. The style sheet references to the value-of method remain unchanged. The present invention enforces security policy by overriding the code that is invoked upon encountering a value-of method invocation from the (unmodified) style sheet. (It would be possible, of course, to modify a style sheet to take advantage of the policy mark-up of the XML document if desired.)

The present invention is neutral to the format of the security policy itself what is required for enforcing a security policy is only that the policy can be accessed by a URI (such as the references to policy objects in an LDAP directory, as shown in FIG. 3) and, of course, that the policy is understood by the instrumentation enforcing that policy in the XSL processor. This has the additional benefit of longevity in solution implementation, since the implementation of the preferred embodiment will not need to be adjusted as new enterprise security policy requirements force a change in the policy encoding and instrumentation: the stored policies will then simply be updated to enforce the new policy requirements, and the references to the stored policy may be updated as necessary (e.g. if the updated policy is stored in a different location).

Although the preferred embodiment has been described as using XSL style sheets, style sheets in other notations may be used instead of XSL (e.g. Document Style Semantics and Specification Language, or DSSSL, which is an International Standard ISO/IEC 10179: 1996) without deviating from the inventive concepts of the present invention. In addition, the policy-driven XSL processor described can also be used to generate encrypted documents in non-XML formats that use SGML-derived tagging, such as HTML; however, a decoder for such a format would need to be modified using the logic defined herein for the augmented XML processor so that the document could be decrypted. This process, however, may not yield a usable document if the viewer is not allowed to see all the document data, due to assumed relationship rules in the non-XML language tags.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product embodied on computer readable media readable by a computing system in a computing environment, for enforcing security policy using style sheet processing, comprising:

computer-readable program code for obtaining an input document;

computer-readable program code for obtaining a Document Type Definition (DTD) that defines elements of said input document, wherein: (1) an attribute of at least one element defined in said DTD references one of a plurality of stored policy enforcement objects; (2) more than one of said references may reference a single stored policy enforcement object; and (3) each of said stored policy enforcement objects specifies a visibility policy for said referencing element or elements, said visibility policy identifying an encryption requirement for all elements having that visibility policy and a community whose members are authorized to view those elements;

computer-readable program code for applying one or more style sheets to said input document, thereby adding markup notation to each element of said input document for which said element definition in said DTD references one of said stored policy enforcement objects specifying a visibility policy with a non-null encryption requirement, resulting in creation of an interim transient document that indicates elements of said input document which are to be encrypted; and computer-readable program code for creating an output document in which each element of said interim transient document for which markup notation has been added is encrypted in a manner that enables each community member that is authorized to view that element to use key distribution material associated with the output document to decrypt the encrypted element, and that precludes decryption of the encrypted element by unauthorized community members.

2. The computer program product according to claim 1, wherein said markup notation in said interim transient document comprises tags of a markup language.

3. The computer program product according to claim 1, wherein said input document is specified in an Extensible Markup Language (XML) notation.

4. The computer program product according to claim 3, wherein said output document is specified in said XML notation.

5. The computer program product according to claim 1, wherein said stored policy enforcement objects further comprise computer-readable program code for overriding a method for evaluating said elements of said input document, and wherein said computer-readable program code for applying said one or more style sheets further comprises computer program code for invoking said computer-readable program code for overriding, thereby causing said markup notation to be added.

6. The computer program product according to claim 5, wherein said style sheets are specified in an Extensible Stylesheet Language (XSL) notation.

7. The computer program product according to claim 6, wherein said method is a value-of method of said XSL notation, and wherein said computer-readable program code for overriding said value-of method is by subclassing said value-of method.

8. The computer program product according to claim 5, wherein:

said overriding method comprises:
computer-readable program code for generating said markup notation as encryption tags; and
computer-readable program code for inserting said generated encryption tags into said interim transient document to surround elements of said interim transient document for which said visibility policy of said elements in said input document have said non-null encryption requirement; and said computer-readable program code for creating said output document further comprises computer-readable program code for encrypting those elements surrounded by said inserted encryption tags.

9. The computer program product according to claim 1, wherein said encryption requirement further comprises specification of an encryption algorithm to be used when encrypting elements having that visibility policy.

10. The computer program product according to claim 1, wherein said encryption requirement further comprises specification of an encryption algorithm strength value to be used when encrypting elements having that visibility policy.

11. The computer program product according to claim 1, wherein said computer-readable program code for creating said output document further comprises:

computer-readable program code for generating a distinct symmetric key for each unique one of said communities identified by said visibility policy in said stored policy objects for each of said elements of said input document; and computer-readable program code for encrypting said distinct symmetric keys separately for each of said members of said community for which said symmetric key was generated, thereby creating member-specific versions of each of said distinct symmetric keys.

12. The computer program product according to claim 11, wherein said computer-readable program code for encrypting each of said distinct symmetric keys separately for each of said members uses a public key of said community member as input when creating each of said member-specific versions.

13. The computer program product according to claim 1, wherein said encrypted elements in said created output document are encrypted using a cipher block chaining mode encryption process.

14. The computer program product according to claim 11, further comprising:

computer-readable program code for creating a key class for each of said unique communities, wherein said key class is associated with each of said encrypted elements of said output document for which members of this unique community are authorized viewers, and wherein said key class comprises: (1) an encryption algorithm identifier and key length used when encrypting said associated encrypted elements; (2) an identifier of each member of said unique community; and (3) one of said member-specific versions of said encrypted symmetric key for each of said identified community members.

15. The computer program product according to claim 11, further comprising:
computer-readable program code for decrypting, for an individual user or process, only those encrypted elements in said output document for which said individual user or process is one of said authorized community members, further comprising:
computer-readable program code for determining zero or more of said communities of which said individual user or process is one of said members;
computer-readable program code for decrypting, for each of said determined communities, said member-specific version of said symmetric key, thereby creating a decrypted key; and
computer-readable program code for decrypting selected ones of said encrypted elements in said output document using said decrypted keys, wherein said selected ones of said encrypted elements are those which were encrypted for one of said determined communities.

16. The computer program product according to claim 14, wherein said computer-readable program code for encrypting each of said distinct symmetric keys separately for each of said members uses a public key of said community member as input when creating each of said member-specific versions and further comprising:
computer-readable program code for decrypting, for an individual user or process, only those encrypted elements in said output document for which said individual user or process is one of said authorized community members, further comprising:
computer-readable program code for determining zero or more of said key classes which identify said individual user or process as one of said members;
computer-readable program code for decrypting, for each of said determined key classes, said member-specific version of said encrypted symmetric key, using a private key of said individual user or process, thereby creating a decrypted key; and
computer-readable program code for decrypting selected ones of said encrypted elements in said output document using said decrypted keys, wherein said selected ones of said encrypted elements are those which were encrypted for one of said determined key classes.

17. The computer program product according to claim 15 or claim 16, further comprising computer-readable program code for substituting a predetermined text message for any encrypted elements in said output document which cannot be decrypted for said individual user or process.

18. The computer program product according to claim 1, wherein said DTD is replaced by a schema.

19. The computer program product according to claim 1, wherein said encryption requirement further comprises specification of an encryption key length.

20. The computer program product according to claim 8, wherein said inserted encryption tags may surround either values of said elements or values and tags of said elements.

21. A system for enforcing security policy using style sheet processing in a computing environment, comprising:
an input document;
a Document Type Definition (DTD) that defines elements of said input document, wherein: (1) an attribute of at least one element defined in said DTD references one of a plurality of stored policy enforcement objects; (2) more than one of said references may reference a single stored policy enforcement object; and (3) each of said stored policy enforcement objects specifies a visibility policy for said referencing element of elements, said visibility policy identifying an encryption requirement for all elements having that visibility policy and a community whose members are authorized to view those elements;
means for applying one or more style sheets to said input document, thereby adding markup notation to each element of said input document for which said element definition in said DTD references one of said stored policy enforcement objects specifying a visibility policy with a non-null encryption requirement, resulting in creation of an interim transient document that indicates elements of said input document which are to be encrypted; and
means for creating an output document in which each element of said interim transient document for which markup notation has been added is encrypted in a manner that enables each community member that is authorized to view that element to use key distribution material associated with the output document to decrypt the encrypted element, and that precludes decryption of the encrypted element by unauthorized community members.

22. The system according to claim 21, wherein said markup notation in said interim transient document comprises tags of a markup language.

23. The system according to claim 21, wherein said input document is specified in an Extensible Markup Language (XML) notation.

24. The system according to claim 23, wherein said output document is specified in said XML notation.

25. The system according to claim 21, wherein said stored policy enforcement objects further comprise means for overriding a method for evaluating said elements of said input document, and wherein said means for applying said one or more style sheets further comprises means for invoking said means for overriding, thereby causing said markup notation to be added.

26. The system according to claim 25, wherein said style sheets are specified in an Extensible Stylesheet Language (XSL) notation.

27. The system according to claim 26, wherein said method is a value-of method of said XSL notation, and wherein said means for overriding said value-of method is by subclassing said value-of method.

28. The system according to claim 25, wherein:
said overriding method comprises:
means for generating said markup notation as encryption tags; and
means for inserting said generated encryption tags into said interim transient document to surround elements of said interim transient document for which said visibility policy of said elements in said input document have said, non-null encryption requirement; and
said means for creating said output document further comprises means for encrypting those elements surrounded by said inserted encryption tags.

29. The system according to claim 21, wherein said encryption requirement further comprises specification of an encryption algorithm to be used when encrypting elements having that visibility policy.

30. The system according to claim 21, wherein said encryption requirement further comprises specification of an encryption algorithm strength value to be used when encrypting elements having that visibility policy.

31. The system according to claim 21, wherein said means for creating said output document further comprises:
   means for generating a distinct symmetric key for each unique one of said communities identified by said visibility policy in said stored policy objects for each of said elements of said input document; and
   means for encrypting said distinct symmetric keys separately for each of said members of said community for which said symmetric key was generated, thereby creating member-specific versions of each of said distinct symmetric keys.

32. The system according to claim 31, wherein said means for encrypting each of said distinct symmetric keys separately for each of said members uses a public key of said community member as input when creating each of said member-specific versions.

33. The system according to claim 21, wherein said encrypted elements in said created output document are encrypted using a cipher block chaining mode encryption process.

34. The system according to claim 31, further comprising:
   means for creating a key class for each of said unique communities, wherein said key class is associated with each of said encrypted elements of said output document for which members of this unique community are authorized viewers, and wherein said key class comprises: (1) an encryption algorithm identifier and key length used when encrypting said associated encrypted elements; (2) an identifier of each member of said unique community; and (3) one of said member-specific versions of said encrypted symmetric key for each of said identified community members.

35. The system according to claim 31, further comprising:
   means for decrypting, for an individual user or process, only those encrypted elements in said output document for which said individual user or process is one of said authorized community members, further comprising:
      means for determining zero or more of said communities of which said individual user or process is one of said members;
      means for decrypting, for each of said determined communities, said member-specific version of said symmetric key, thereby creating a decrypted key; and
      means for decrypting selected ones of said encrypted elements in said output document using said decrypted keys, wherein said selected ones of said encrypted elements are those which were encrypted for one of said determined communities.

36. The system according to claim 34, wherein said means for encrypting each of said distinct symmetric keys separately for each of said members uses a public key of said community member as input when creating each of said member-specific versions and further comprising:
   means for decrypting, for an individual user of process, only those encrypted elements in said output document for which said individual user or process is one of said authorized community members, further comprising:
      means for determining zero or more of said key classes which identify said individual user or process as one of said members;
      means for decrypting, for each of said determined key classes, said member-specific version of said encrypted symmetric key, using a private key of said individual user or process, thereby creating a decrypted key; and
      means for decrypting selected ones of said encrypted elements in said output document using said decrypted keys, wherein said selected ones of said encrypted elements are those which were encrypted for one of said determined key classes.

37. The system according to claim 35 or claim 36 further comprising means for substituting a predetermined text message for encrypted elements in said output document which cannot be decrypted for said individual user or process.

38. The system according to claim 21, wherein said DTD is replaced by a schema.

39. The system according to claim 21, wherein said encryption requirement further comprises specification of an encryption key length.

40. The system according to claim 28, wherein said inserted encryption tags may surround either values of said elements or values and tags of said elements.

41. A method for enforcing security policy using style sheet processing in a computing environment, comprising:
   providing an input document;
   providing a Document Type Definition (DTD) that defines elements of said input document, wherein: (1) an attribute of at least one element defined in said DTD references one of a plurality of stored policy enforcement objects; (2) more than one of said references may reference a single stored policy enforcement object; and (3) each of said stored policy enforcement objects specifies a visibility policy for said referencing element of elements, said visibility policy identifying an encryption requirement for all elements having that visibility policy and a community whose members are authorized to view those elements;
   applying one or more style sheets to said input document, thereby adding markup notation to each element of said input document for which said element definition in said DTD references one of said stored policy enforcement objects specifying a visibility policy with a non-null encryption requirement, resulting in creation of an interim transient document that indicates elements of said input document which are to be encrypted; and
   creating an output document in which each element of said interim transient document for which markup notation has been added is encrypted in a manner that enables each community member that is authorized to view that element to use key distribution material associated with the output document to decrypt the encrypted element, and that precludes decryption of the encrypted element by unauthorized community members.

42. The method according to claim 41, wherein said markup notation in said interim transient document comprises tags of a markup language.

43. The method according to claim 41, wherein said input document is specified in an Extensible Markup Language (XML) notation.

44. The method according to claim 43, wherein said output document is specified in said XML notation.

45. The method according to claim 41, wherein said stored policy enforcement objects further comprise executable code for overriding a method for evaluating said elements of said input document, and wherein said applying one or more style sheets to said input document step further comprises overriding said method for evaluating, thereby causing said markup notation to be added.

46. The method according to claim 45, wherein said style sheets are specified in an Extensible Stylesheet Language (XSL) notation.

47. The method according to claim 46, wherein said method is a value-of method of said XSL notation, and wherein said overriding said value-of method is by subclassing said value-of method.

48. The method according to claim 45, wherein:
said overriding further comprises:
generating said markup notation as encryption tags; and
inserting said generated encryption tags into said interim transient document to surround elements of said interim transient document for which said visibility policy of said elements in said input document have said non-null encryption requirement; and
said creating said output document further comprises the encrypting those elements surrounded by said inserted encryption tags.

49. The method according to claim 41, wherein said encryption requirement further comprises specification of an encryption algorithm to be used when encrypting elements having that policy.

50. The method according to claim 41, wherein said encryption requirement further comprises specification of an encryption algorithm strength value to be used when encrypting elements having that policy.

51. The method according to claim 41, wherein said creating said output document further comprises:
generating a distinct symmetric key for each unique one of said communities identified by said visibility policy in said stored policy objects for each of said elements of said input document; and
encrypting said distinct symmetric keys separately for each of said members of said community for which said symmetric key was generated, thereby creating member-specific versions of each of said distinct symmetric keys.

52. The method according to claim 51, wherein said encrypting each of said distinct symmetric keys separately for each of said members uses a public key of said community member as input when creating each of said member-specific versions.

53. The method according to claim 41, wherein said encrypted elements in said created output document are encrypting using a cipher block chaining mode encryption process.

54. The method according to claim 52, further comprising:
creating a key class for each of said unique communities, wherein said key class is associated with each of said encrypted elements of said output document for which members of this unique community are authorized viewers, and wherein said key class comprises: (1) an encryption algorithm identifier and key length used when encrypting said associated encrypted elements; (2) an identifier of each member of said unique community; and (3) one of said member-specific versions of said encrypted symmetric key for each of said identified community members.

55. The method according to claim 51, further comprising
decrypting, for an individual user or process, only those encrypted elements in said output document for which said individual user or process is one of said authorized community members, further comprising:
determining zero or more of said communities of which said individual user or process is one of said members;
decrypting, for each of said determined communities, said member-specific version of said symmetric key, thereby creating a decrypted key; and
decrypting selected ones of said encrypted elements in said output document using said decrypted keys, wherein said selected ones of said encrypted elements are those which were encrypted for one of said determined communities.

56. The method according to claim 54, wherein said encrypting said distinct symmetric keys separately for each of said members uses a public key of said community member as input when creating each of said member-specific versions and further comprising:
decrypting, for an individual user or process, only those encrypted elements in said output document for which said individual user or process is one of said authorized community members, further comprising:
determining zero or more of said key classes which identify said individual user or process as one of said members;
decrypting, for each of said determined key classes, said member-specific version of said encrypted symmetric key, using a private key of said individual user or process, thereby creating a decrypted key; and
decrypting selected ones of said encrypted elements in said output document using said decrypted keys, wherein said selected ones of said encrypted elements are those which were encrypted for one of said determined key classes.

57. The method according to claim 55 or claim 56, further comprising substituting a predetermined text message for any encrypted elements in said output document which cannot be decrypted for said individual user or process.

58. The method according to claim 41, wherein said DTD is replaced by a schema.

59. The method according to claim 41, wherein said encryption requirement further comprises specification of an encryption key length.

60. The method according to claim 48, wherein said inserted encryption tags may surround either values of said elements or values and tags of said elements.

* * * * *

UNITED STATES PATENT AND TRADEMARK OFFICE
CERTIFICATE OF CORRECTION

PATENT NO. : 6,931,532 B1  
DATED : August 16, 2005  
INVENTOR(S) : Marc C. Davis et al.

It is certified that error appears in the above-identified patent and that said Letters Patent is hereby corrected as shown below:

Column 42,  
Line 3, between "computer" and "program" insert -- readable --.

Column 47,  
Line 3, replace "document step further" with -- document further --.

Signed and Sealed this

Sixth Day of December, 2005

JON W. DUDAS  
*Director of the United States Patent and Trademark Office*